(12) United States Patent
Wigren et al.

(10) Patent No.: US 12,082,141 B2
(45) Date of Patent: Sep. 3, 2024

(54) STABLE MULTI-POINT ALIGNMENT

(71) Applicant: Telefonaktiebolaget LM Ericsson (publ), Stockholm (SE)

(72) Inventors: Torbjörn Wigren, Uppsala (SE); Ramon Delgado, Elermore Vale (AU); Richard Middleton, North Lambton (AU); Katrina Lau, Wallsend (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 692 days.

(21) Appl. No.: 17/271,593

(22) PCT Filed: Aug. 31, 2018

(86) PCT No.: PCT/SE2018/050878
§ 371 (c)(1),
(2) Date: Feb. 25, 2021

(87) PCT Pub. No.: WO2020/046183
PCT Pub. Date: Mar. 5, 2020

(65) Prior Publication Data
US 2021/0345277 A1    Nov. 4, 2021

(51) Int. Cl.
*H04W 56/00* (2009.01)
*H04L 5/00* (2006.01)
*H04L 43/0864* (2022.01)

(52) U.S. Cl.
CPC ....... *H04W 56/0045* (2013.01); *H04L 5/0055* (2013.01); *H04L 43/0864* (2013.01)

(58) Field of Classification Search
CPC ............. H04W 56/0045; H04L 5/0055; H04L 43/0864

(Continued)

(56) References Cited

U.S. PATENT DOCUMENTS

2012/0158957 A1* 6/2012 Nakayama .......... H04L 43/0864
709/224
2015/0281288 A1* 10/2015 Levinson ................ H04L 47/41
709/219
2019/0306066 A1* 10/2019 Wigren ............... H04L 43/0864

FOREIGN PATENT DOCUMENTS

WO      2017222435 A1    12/2017
WO      WO-2018004412 A1 * 1/2018 ......... H04L 43/0864

OTHER PUBLICATIONS

International Search Report and Written Opinion for International Application No. PCT/SE2018/050878, dated May 16, 2019, 10 pages.

(Continued)

*Primary Examiner* — Kwang B Yao
*Assistant Examiner* — Syed M Bokhari
(74) *Attorney, Agent, or Firm* — Sage Patent Group

(57) ABSTRACT

According to a first aspect, there is provided a method for delay alignment in a multi-point communication system. The method comprises determining of a respective reference value of round trip time for n+1 signalling paths in the multi-point communication system, where n>0. The determination is performed using n reference values of round trip time skews between a respective signalling path and a single reference signalling path of the n+1 signalling paths, and a reference value of a sum of round trip times over all of the n+1 signalling paths as exclusive input values. The respective reference values of round trip times are limited within a predetermined allowed interval for round trip times. The method further comprises performing of a separate, preferably globally stable, control of data signalling in each single one of the n+1 signalling paths based on the respective reference values of round trip times.

17 Claims, 14 Drawing Sheets

(58) Field of Classification Search
USPC .......................................................... 370/329
See application file for complete search history.

(56) References Cited

OTHER PUBLICATIONS

Richard H. Middleton et al., "Data Flow Delay Equalization for Feedback Control Applications Using 5G Wireless Dual Connectivity," 2017, 7 pages, IEEE.

Torbjörn Wigren, "Globally Stable Wireless Data Flow Control," Mar. 2018, pp. 469-478, IEEE Transactions on Control of Network Systems, vol. 5, No. 1.

Ramón A. Delgado et al., "Networked Delay Control for 5G Wireless Machine-Type Communications Using Multiconnectivity," 2018, pp. 1-16, IEEE Transactions on Control Systems Technology.

* cited by examiner

STABLE MULTI-POINT ALIGNMENT

CROSS-REFERENCE TO RELATED APPLICATIONS

This application is a National stage of International Application No. PCT/SE2018/050878, filed Aug. 31, 2018, which is hereby incorporated by reference.

TECHNICAL FIELD

The proposed technology generally relates to methods and devices in multi-point communication systems and in particular to methods and devices for delay alignment in a multi-point communication system.

BACKGROUND

Today's wireless cellular systems have been designed to handle very efficient data transfer between a single user equipment (UE) and a single base station, denoted eNB in 4th Generation (4G) systems and gNB in 5th Generation (5G) systems. These solutions are sufficient at today's carrier frequencies close to 1-2 GHz. In future 5G cellular system a shift towards higher carrier frequencies is a necessity, to be able to utilize the available spectrum, thereby achieving a higher capacity overall.

A consequence of the move to higher carrier frequencies is that the radio propagation is transformed from "diffuse" scattering to beamlike propagation. This effect is also present for lower frequency bands, say in the 3-4 GHz region, in particular since massive beamforming using the new advanced antenna systems, i.e. Antenna Array Systems (AAS), are becoming widely used also at these lower frequency bands. The beamlike radio propagation leads to sharp diffraction effects and increasingly heavy radio shadowing behind obstacles. This in turn makes it more difficult to obtain uniform coverage from a single 5G base station.

The implication is a need to transmit from multiple non-co-located transmit points, to cover a single cell. Such massive multi-point transmission will soon be under standardization for New Radio (NR) radio access in the 3rd Generation Partnership Project (3GPP). It should be noted that multi-point transmission is also considered for the present 4G Long-Term Evolution (LTE) system, however the need and also the massiveness of the solutions for 4G are believed to be less than those of future 5G cellular systems. The same is true for the Institute of Electrical and Electronics Engineers (IEEE) standards of which WIFI constitute a major part.

In a massive multi-point transmission system, where data is arriving from uplink nodes, each involved transmit point needs to be given access to portions of this data, for transmission over the wireless interface. In many applications the data is closely related to data simultaneously being transmitted from other transmit points.

This is e.g. the case for streaming video, in which case the data for a specific part of the video are needed at the same time, to within a certain pre-determined re-ordering margin, in the receiving UE. Another related use case is the case when video is distributed to large multi-user screens and the corresponding audio is sent to e.g. individual user headsets, to minimize audio interference. In such case the audio and video streams may need to be time aligned in the UEs. It should here be noted that the different transmit points may transmit different data, or the same data for diversity gain, or a mix of these alternatives.

There are a number of requirements or desirable properties on any delay aligning controller.

One requirement is performance. This means that the controller should result in a close to constant delay, e.g. downlink or round trip, as seen by the application. The delay variation, i.e. jitter, should be kept at an as low level as possible. This requires that also the delay skews need to be kept at as low levels as possible, since otherwise adjacent data transmitted over different paths will have different delays, resulting in significant jitter in the application layer data stream.

Another requirement is stability. Stability means that, given certain underlying assumptions on the characteristics of the delay aligning control system, the delay aligning control system operates as designed, without sustained oscillations or signals that grow without limit, leading to malfunction of the system. Stability can be local, meaning that it only holds in a certain region around a nominal delay skew operating point, or global, when stability holds irrespective of the operating point. Obviously global stability under as general assumptions as possible is the desired property, since then there are guarantees that the delays aligning control system always operates as it is intended.

Yet another requirement is low complexity. Since there are many thousands of controllers in a single node, the computational complexity needs to be low.

In the prior art there are controllers that perform relatively "well". However in prior art there is no delay aligning control system for the round trip delay aligning control use case that is known to be unconditionally globally stable. Typically, the delay aligning control systems are only globally stable, up to some maximum round trip delay of the connection, said maximum round trip delay depending on the applied properties, i.e. numerical values, of the feedback control algorithms.

A problem with the existing solutions for delay aligning control is that none of the prior art algorithms are globally stable, independently of the round trip delay of the communication system. Rather, there seems to be a maximum round trip delay for which global stability can be guaranteed for any given delay aligning controller parameter setting, see e.g. R. H. Middleton, T. Wigren, K. Lau and R. Delgado, "Data flow delay equalization for feedback control applications using 5G wireless dual connectivity", Proc. VTC 2017 Spring, Sydney, Australia, Jun. 4-7, 2017, and R. A. Delgado, K. Lau, R. H. Middleton and T. Wigren, "Networked delay control for 5G wireless machine type communications using multi-connectivity", to appear in IEEE Trans. Contr. Sys. Tech., 2018.

SUMMARY

It is an object to provide delay aligning control that is globally stable, independently of the round trip delay of the communication system.

This and other objects are met by embodiments of the proposed technology.

According to a first aspect, there is provided a method for delay alignment in a multi-point communication system. The method comprises determining of a respective reference value of round trip time for n+1 signalling paths in the multi-point communication system, where n>0. The determination is performed using n reference values of round trip time skews between a respective signalling path and a single reference signalling path of the n+1 signalling paths, and a reference value of a sum of round trip times over all of the n+1 signalling paths as exclusive input values. The respective reference values of round trip times are limited within a predetermined allowed interval for round trip times. The methods further comprises performing of a separate, preferably globally stable, control of data signalling in each single one of the n+1 signalling paths based on the respective reference values of round trip times.

According to a second aspect, there is provided a network node configured to perform globally stable delay alignment in a multi-point communication system. The network node is configured to determine a respective reference value of round trip time for n+1 signalling paths in said multi-point communication system, where n>0. The determining is performed using n reference values of round trip time skews between a respective signalling path and a single reference signalling path of the n+1 signalling paths, and a reference value of a sum of round trip times over all of the n+1 signalling paths as exclusive input values. The respective reference values of round trip times are limited within a predetermined allowed interval for round trip times. The network node is further configured to perform a separate, preferably globally stable, control of data signalling in each single one of the n+1 signalling paths based on the respective reference values of round trip times.

According to a third aspect, there is provided a computer program comprising instructions, which when executed by at least one processor, cause the at least one processor to determine a respective reference value of round trip time for n+1 signalling paths in said multi-point communication system, where n>0. The determination is performed using n reference values of round trip time skews between a respective signalling path and a single reference signalling path of the n+1 signalling paths, and a reference value of a sum of round trip times over all of the n+1 signalling paths as exclusive input values. The respective reference values of round trip times are limited within a predetermined allowed interval for round trip times. The instructions, when executed by the at least one processor, further cause the at least one processor to perform a separate, preferably globally stable, control of data signalling in each single one of the n+1 signalling paths based on the respective reference values of round trip times.

According to a fourth aspect, there is provided a computer-program product comprising a computer-readable medium having stored thereon a computer program according to the third aspect.

The proposed technology provides improved delay aligning control, for use in 4G, combined 4G/5G and 5G NR wireless systems. The disclosed round trip delay aligning control algorithm is proved to be globally stable, irrespective of the round trip delay of the systems it is deployed to control, and irrespective of the controller gains. This guarantees that the round trip delay aligning controller always operates as intended. The disclosed round trip delay aligning control algorithm has high performance since high gain feedback can be applied without risking stability.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Figure 1:
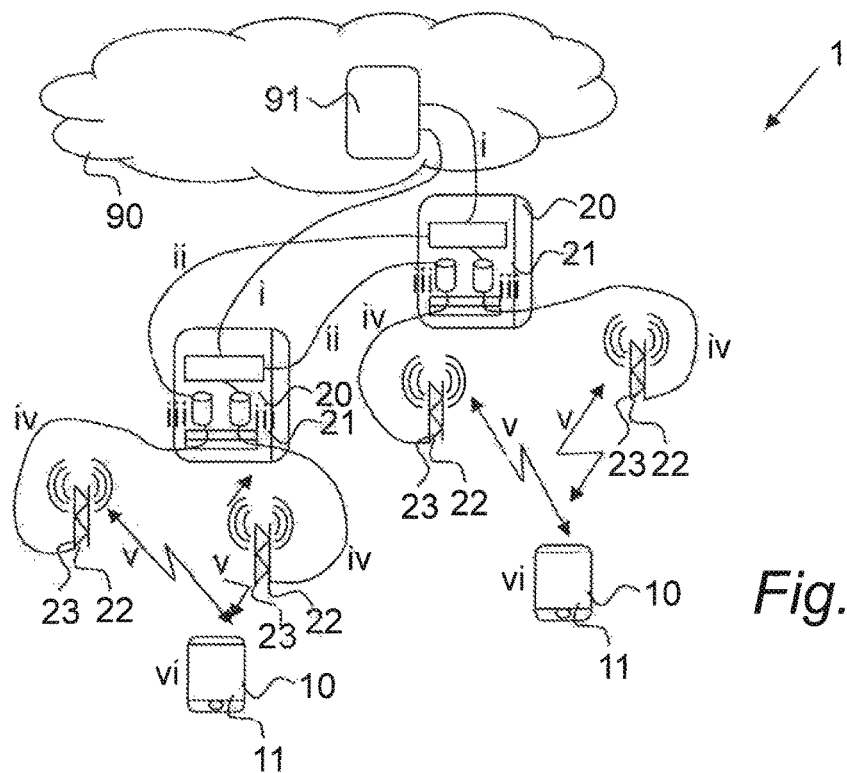
FIG. 1 is a schematic illustration of a tactile wireless internet gaming application in a two node transmission scenario.

For a better understanding of the proposed technology, it may be useful to begin with a brief overview of different use cases illustrating different views of the technical problem A typical Ultra-Reliable Low Latency Communication (URLLC) use case anticipated to become frequent in wireless 5G NR systems is depicted in FIG. 1. The figure is a schematic illustration of a tactile wireless internet gaming application in a two node transmission scenario. The generalization to n-node transmission is straightforward for the proposed invention.

It is well known that the use of tactile feedback requires a low round trip delay, not exceeding about 5 milliseconds. In the case of FIG. 1, this delay budget therefore need to be contained when considering the delay from one tactile smart phone, to the other tactile smart phone, and back. To avoid delay variation and additional buffering delay, it is also needed to align the round trip delays over all data paths indicated in the figure.

To describe FIG. 1 and the end-to-end delay alignment architecture in a multi-point communication system 1 in more detail, the starting point is taken to be in one of the UEs 10, in this case a tactile smart phone 11. This smart phone 11 is supposed to be equipped with tactile force feedback functionality, either in the phone itself or in a connected hardware device. This functionality could comprise actuators that allow the user to feel a force related to an object simulated in the other smart phone 11, in response to own movement of e.g. fingers over the representation of said remote object in the own smart phone 11. This representation and the force commands affecting the actuators of the own smart phone 11, would be generated in the other smart phone, based on transmitted descriptions of the movements over the representation of the remote object in the own smart phone 11. This explains how an end-to-end force feedback loop is operating between the two tactile smart phones 11.

The data transmission between the two tactile smart phones 11 is handled by a tactile virtual reality (VR) server 91 located in the cloud 90. This VR server 91 receives movement data feedback and force feedback actuator commands from each tactile smart phone 11, after which it re-distributes it to the other tactile smart phone 11 continuously, typically with each type of information received and forwarded with a constant sampling rate significantly higher than the inverse of the desired round trip delay, typically lower than 5 milliseconds. The data paths from the tactile VR server 91 to the tactile smart phones 11 may comprise (i) an internet transport link to an input queue of a base station 20, in this case a gNB 21, associated with a first delay, (ii) Radio Access Network (RAN) internal transport links from the input queue to several transmission queues, in the same or connected other gNBs 21, each RAN transport associated with a separate second delay, (iii) transmission queues, each transmission queue associated with a third separate transmission queue delay originating from data traversing the queues, (iv) antennas 22, in this case AAS 23 radio transport links, each transport associated with a fourth delay, (v) wireless interfaces, each wireless interface being associated with a separate wireless delay, and (vi) UE processing functionality, each UE 10 having a separate processing delay. All these six connections operate both in a downlink, i.e. to the UE 10, and uplink, i.e. from the UE 10, direction. Each UE 10 is associated with one complete downlink and uplink connection, each one extending over the six link parts discussed above.

In a massive multi-point transmission system, where data is arriving from uplink nodes, each involved transmit point needs to be given access to portions of this data, for transmission over the wireless interface. In many applications the data is closely related to data simultaneously being transmitted from other transmit points.

This is e.g. the case for streaming video, in which case the data for a specific part of the video are needed at the same time, to within a certain pre-determined re-ordering margin, in the receiving UE. Another related use case is the case when video is distributed to large multi-user screens and the corresponding audio is sent to e.g. individual user headsets, to minimize audio interference. In such case the audio and video streams may need to be time aligned in the UEs. It should here be noted that the different transmit points may transmit different data, or the same data for diversity gain, or a mix of these alternatives.

Figure 2:
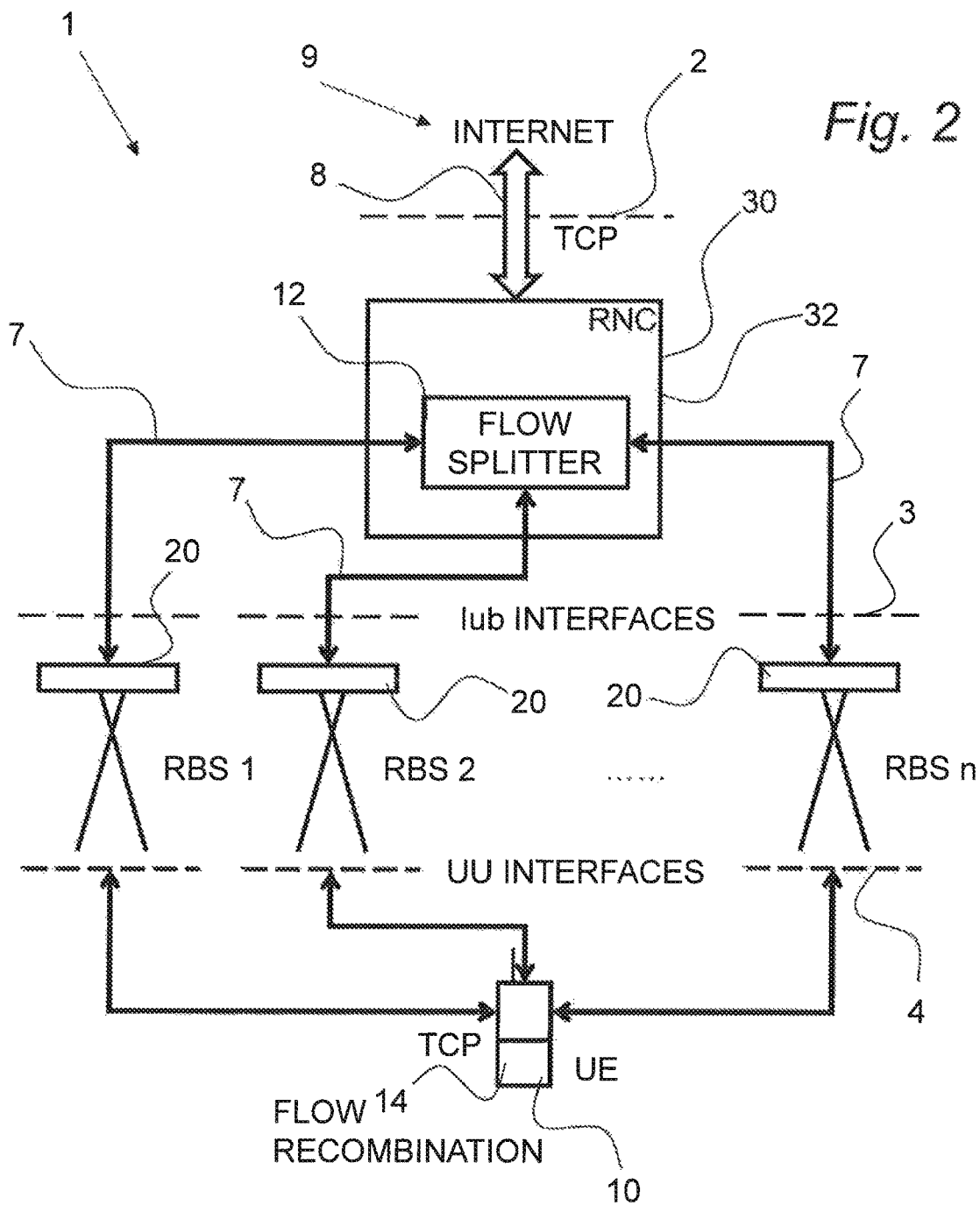
FIG. 2 is a downlink delay aligning control scheme.

One mechanism for achieving time alignment by means of so called delay aligning control or delay skew control in a multi-point communication system 1 is schematically illustrated in FIG. 2. That figure depicts an architecture of the existing prior art $3^{rd}$ Generation (3G) Wideband Code Division Multiple Access (WCDMA) system. The figure depicts a 3G RNC, however that could also be the PDCP layer in a 4G or 5G node. The RBSs would then be eNodeBs or gNodeBs. Similar architectures in 4G and 5G could involve nodes from both the radio access network (RAN) and the core network (CN).

Data 8 from the Internet 9 is received over a Transmission Control Protocol (TCP) interface 2 by a flow splitter 12 of a network node 30, in this case a Radio Network Controller (RNC) 32. This data 8 will in the best case be an ordered set of packets that need to be transmitted to a UE 10. The data 8 is split by the flow splitter 12 into a number of individual flows or signaling paths 7 of packets, provided to a multitude of transmit nodes or wireless-transmission points, typically Radio Base Stations (RBS) 20, e.g. NodeBs, eNBs or gNBs, over a network interface 3, in this case an Iub. The RBSs 20 transmit the packets by radio signals over wireless interfaces 4, in this case UU; to the UE 10.

In the UE 10, a recombiner 14 performs a flow recombination. However, due to non-uniform and varying delays in the individual flows or signaling paths 7, the packets received by the UE 10 will in general be out of order. The delay variations that cause the out-of-ordering may be the result of:

Varying queuing delays in the RBS,
Varying transport network delays, e.g. due to congestion, and/or
Varying radio link quality, causing RBS buffer size variation.

In FIG. 2, a flow splitter 12 is implemented by a delay aligning control algorithm that achieves delay aligning control by using the transmission queues in the radio base stations (RBS) 20 as actuators. The delay aligning controller varies the data rate from the incoming TCP flow, over each fronthaul connection to the RBSs 20. This in turn regulates the data volume and thereby the dwell time in each transmission queue. This way the total data travel time to the UEs 10 can be affected, over each of the multiple data paths.

For this to work, the controller node which contains the data splitter, receives feedback on the time of arrival of numbered data packets, from each RBS 20. Based on this, the momentary delay deviation of each data path, as compared to an average or reference data path can be evaluated, these deviations being denoted delay skew measurement. These measurements are processed by the delay aligning controller, to compute the data rates for each transmission path.

Note that this use case requires that all nodes are synchronized, or that the time relations between the nodes are known.

The other main use case is the so called round trip delay aligning control use case. The application layer is depicted on top, with the functionality of the delay aligning controller shown below. There the task is to regulate the delay and delay skews, as measured from a network node 30, in this case a controller node 31, of FIG. 3, over the network interfaces to a multitude of gNBs 21 (in 5G NR), through the transmit data queues, over the wireless interface to the UE 10, back over the wireless interface, and relayed over the transmission nodes back to the controller node. Note that in this case the time of transmission of a data item and the time when the acknowledgment is received back, can be measured in the controller node alone, synchronization is therefore not needed. The mechanism by which the controller works, i.e. by manipulation of the data rates to each transmission node, to vary the transmit queue dwell time, is the same as in the downlink delay aligning control use case.

Figure 3:
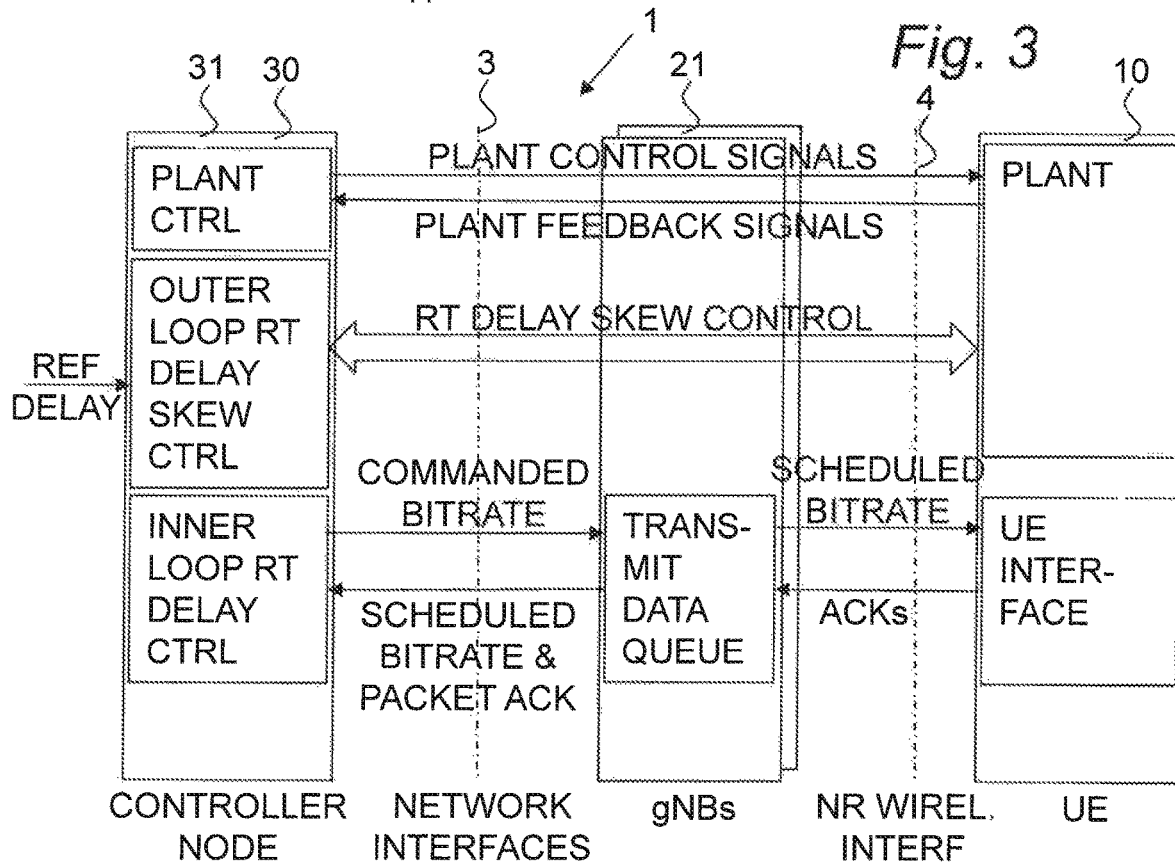
FIG. 3 is an illustration of a round trip delay aligning control use case.

As is clear from FIG. 3, the delay aligning controller operates at a lower layer than the one where application data is transmitted.

The following section explains the basics of the automatic control nomenclature and terminology used. It is stressed that this terminology is part of the prior art in the field of automatic control.

As a start a number of representations of a dynamic process need to be introduced. A dynamic process is one where the output depends not only on the present input signal but also on previous inputs and outputs. Put otherwise the dynamic process has memory. The most basic dynamic process is the linear one that can be described by a differential equation as:

$$y^{(n)}(t) + a_1 y^{(n-1)} + \ldots + a_n y(t) = b_0 u^{(n)}(t) + \ldots b_n u(t). \quad (1)$$

Here y(t) is the output signal, u(t) is the input signal, t is the time, while $a_i$ i=1 . . . n and $b_j$ j=0, . . . , m are constant parameters. (i) denotes differentiation wrt time i times. The above differential equation has order n. It has one input signal and one output signal. For simplicity all concepts are explained in this context, but the generalization to more than one input signal and more than one input signal is available in prior art textbooks.

By taking Laplace transforms and setting initial values to zero, the differential equation is transformed to be represented by a transfer function H(s), where s denotes the Laplace transform variable which is closely related to the angular frequency used in Fourier transforms. The result is:

$$H(s) = \frac{B(s)}{A(s)} = \frac{b_0 s^m + b_1 s^{m-1} + \ldots + b_m}{s^n + a_1 s^{n-1} + \ldots + a_n}. \quad (2)$$

The relation between the output signal and input signal Laplace transforms Y(s) and U(s) are:

$$Y(s) = H(s)U(s). \quad (3)$$

The poles $p_i$ i=1, . . . , n of the process are given by the equation A(s)=0. For simplicity only strictly stable open loop processes with all poles in the left complex half plane is considered here. In general poles are real or complex conjugate pairs.

The properties of the dynamic process can also be studied in the frequency domain in terms of complex valued frequency functions Y(jω), H(jω) and U(jω). ω a denotes the angular frequency that fulfils:

$$\omega = 2\pi f, \quad (4)$$

where f is the frequency in Hz. Below, frequency is used for angular frequency.

Figure 4:
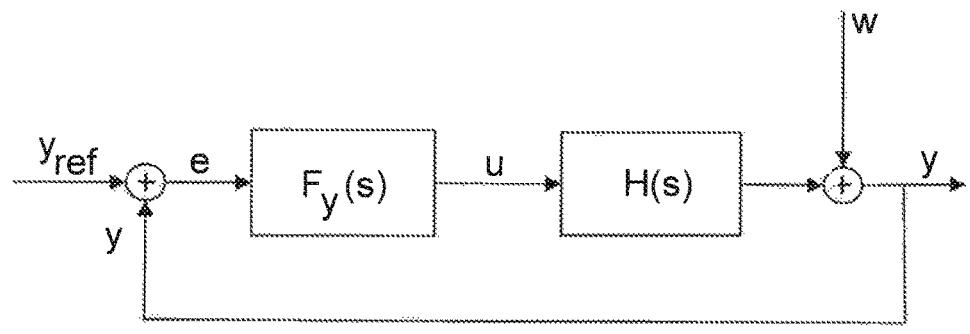
FIG. 4 is a block diagram defining a closed loop control system.

The following definition are best explained with respect to FIG. 4, where $F_y(s)$ is the feedback gain. The closed loop system is then computed as follows:

$$Y(s) = W(s) + H(s)F_y(s)(Y_{ref}(s) - Y(s)), \quad (5)$$

which gives:

$$Y(s) = \frac{F_y(s)H(s)}{1 + F_y(s)H(s)} Y_{ref}(s) + \frac{1}{1 + F_y(s)H(s)} W(s). \quad (6)$$

This gives the effect of the reference signal and the disturbance on the output. The remaining definitions now follow.

The closed loop bandwidth $\omega_{CL}$ of the control system is given by the equation:

$$\left| \frac{F_y(j\omega_{CL})H(j\omega_{CL})}{1 + F_y(j\omega_{CL})H(j\omega_{CL})} \right|^2 = \frac{1}{2} \left| \frac{F_y(0)H(0)}{1 + F_y(0)H(0)} \right|^2. \quad (7)$$

The closed loop static error of the control system is given by the equation:

$$y_{ref} - y = \frac{1}{1 + F_y(0)H(0)} (y_{ref} - w), \quad (8)$$

The static disturbance rejection of the control system is given by the static sensitivity function:

$$S(0) = \frac{1}{1 + F_y(0)H(0)}. \quad (9)$$

The dynamic disturbance rejection of the control system is determined by the sensitivity function:

$$S(j\omega) = \frac{1}{1 + F_y(j\omega)H(j\omega)}. \quad (10)$$

The complimentary sensitivity function of the control system, T(jω)=1−S(jω) determines the robustness of the control system with respect to un-modelled dynamics.

The technology presented herein addresses the problem of global stability. By replacement of the outer delay aligning control loop of prior art solutions with a static round trip delay reference computation scheme, the outer aligning control loop becomes, as such, globally stable. The proposed solution also has a low computational complexity. The proposed solution thereby runs n+1 window based single path controllers, based on said round trip delay reference computation. Since the separate single path controllers also, as such, preferably are globally stable, the entire system also acquires a corresponding stability. The major advantage is thus that the disclosed n+1 path delay aligning controller is globally stable, for any round trip delay of the delay aligning control system, and for any value of the single path controller gains applied. The latter fact ensures that high gain proportional control can be applied, which results in very good performance. The global stability has engineering impacts as well, since stability supervision software, as for prior art delay skew controllers, is not needed.

The preferred single path controller, as described herein, is, as will be discussed further below, globally (L_2) stable. However, it is obvious for anyone skilled in the art that other stability definitions and algorithms, rendering globally stable algorithms and the associated advantages described herein, could be derived and used together with the basic concept of the here presented technology.

Figure 5:
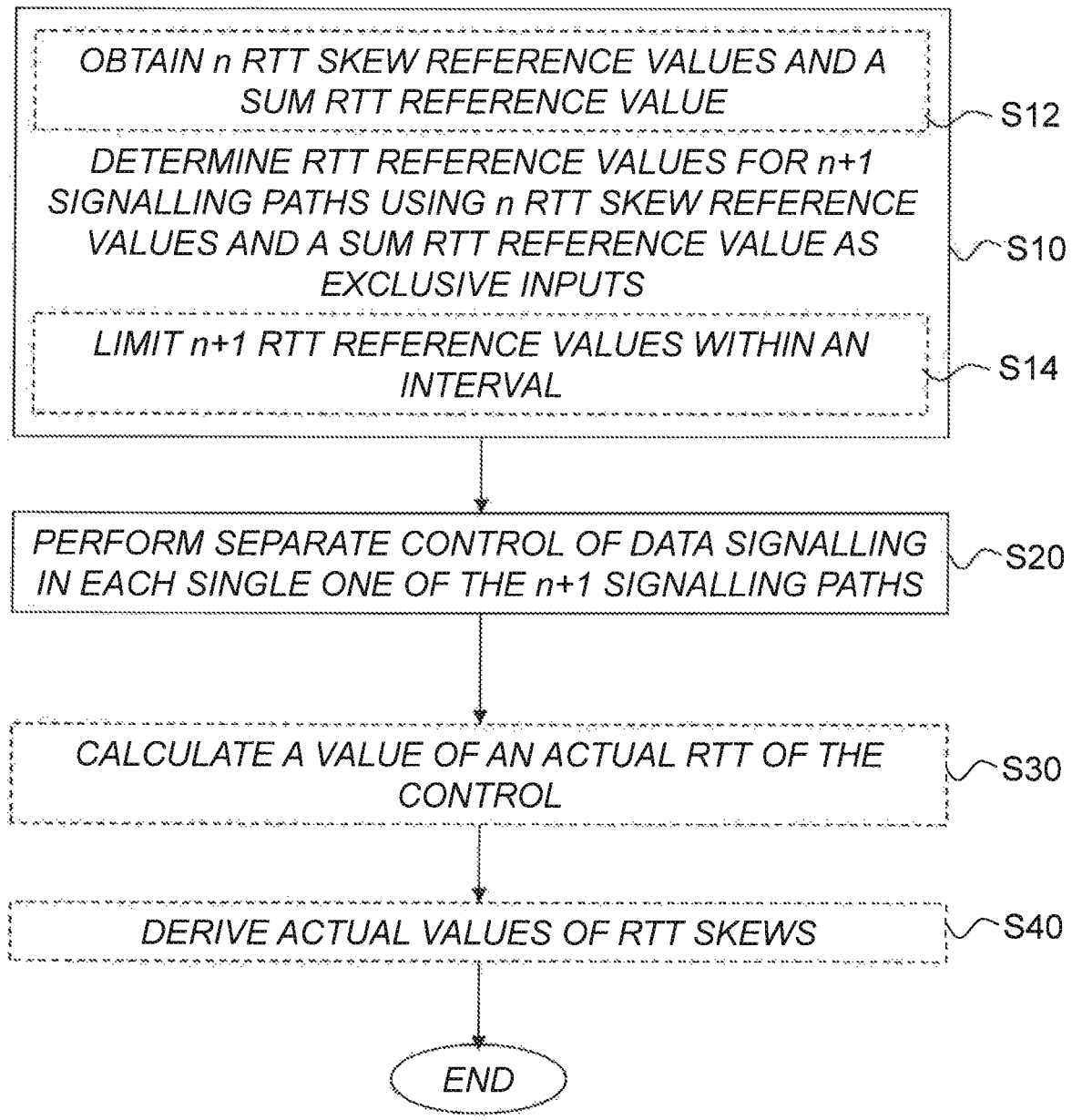
FIG. 5 is a schematic flow diagram illustrating steps of an embodiment of a method for delay alignment in a multi-point communication system.

FIG. 5 illustrates a flow diagram of steps of an embodiment of a method for delay alignment in a multi-point communication system. In step S10 a respective reference value of Round Trip Time (RTT) for n+1 signalling paths in said multi-point communication system is determined. Here n>0. The determination is performed using n reference values of RTT skews between a respective signalling path and a single reference signalling path of said n+1 signalling paths, and a reference value of a sum of RTTs over all of the n+1 signalling paths as exclusive input values. In other words, throughout the present disclosure, the only variable inputs to the determination are the n reference values of RTT skews and the reference value of a sum of RTTs. This means that the determined reference values of Round Trip Time (RTT) for n+1 signalling paths are only dependent on these original input values and no other conditions. Preferably, the determining step S10 comprises obtaining, in step S12, of the n RTT skew reference values and the sum of RTTs. The determination also preferably comprises a limitation, S14, of the respective reference values of RTT within a predetermined allowed interval for RTTs.

In step S20, a separate, globally stable, control of data signalling is performed in each single one of the n+1 signalling paths based on the respective reference values of RTTs.

Throughout the present disclosure, the separate control performed in each single one of the signalling paths is to be understood that the control performed in one of the signalling paths is independent of any control of any of the other signalling paths. In other words, within each signalling path, the conditions in any of the other signalling paths are of no importance.

In one embodiment, the method comprises the further step, S30, of calculating, for each of the n+1, a value of an actual RTT achieved by the globally stable control.

In one embodiment, the method also comprises the further step, S40, of deriving actual values of RTT skews between the respective signalling paths and the single reference signalling path, as well as an actual value of a sum of RTTs over all of the n+1 paths. This deriving is typically performed by a simple linearly combining of the values of an actual RTT.

The key technical idea that leads to the advantages of the presented technology is that the round trip delay aligning controller is designed without any feedback paths. This implies that de-stabilization due to feedback is ruled out. Then, if all dynamic blocks of the round trip delay aligning controller are globally stable, the global stability properties will be inherited by the round trip delay aligning controller.

Figure 6:
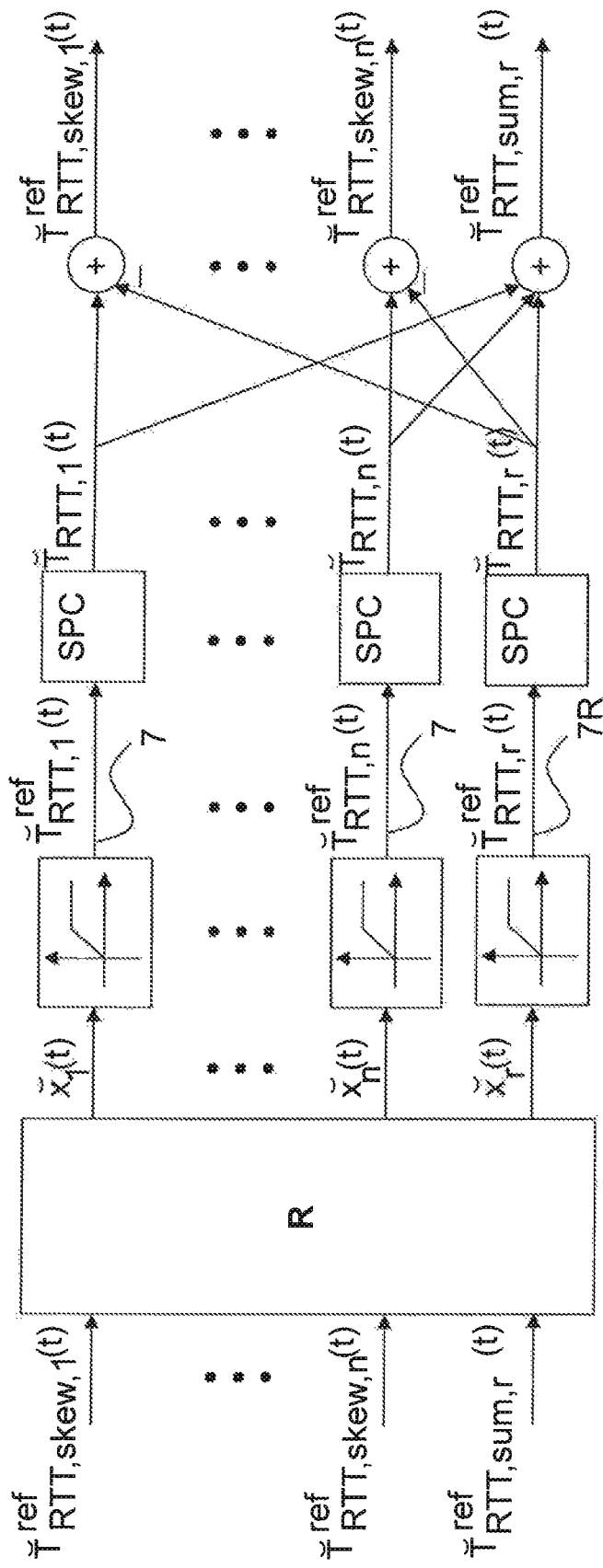
FIG. 6 is a block diagram of an embodiment of a round trip delay aligning controller.

The first characteristic property of the round trip delay aligning controller is therefore the architecture, disclosed with a block diagram of an embodiment depicted in FIG. 6. As can be seen the round trip delay alignment problem is there solved by a controller with a block diagram having the property that no block receives input from any later block, or equivalently to the right in FIG. 6, in the signal chain. The round trip delay aligning controller is therefore based only on forward signals, i.e. signals that are sent from one block to a later block in the signal chain for further processing.

To describe FIG. 6 further, the input or reference signals to the delay aligning round trip controller consists of:

$\check{T}_{RTT,skew,i}^{ref}(t)$, i=1, . . . , n—The reference value (desired value) for the round trip delay difference between path i and reference path r.

$\check{T}_{RTT,sum,r}^{ref}(t)$—The reference value for the sum of the round trip delays, taken over all paths, i=1, . . . , n, r.

These signals are the input to a novel round trip reference computation mechanism block, denoted R. This second characterizing feature is described more in detail further below. The outputs of this block consist of signals:

$$\bar{x}_i(t), i = 1, \ldots, n, r. \tag{11}$$

These signals are separate for each signal path and they form the baseline for the computation of the single path round trip reference signals. This computation ensures that these signals are nonnegative and optionally large enough to serve as single path round trip reference signals. This step is performed by a static saturation function, operating as follows:

$$\bar{T}_{RTT,i}^{ref}(t) = \begin{cases} RTT_{max,i}, & \bar{x}_i(t) > RTT_{max,i} \\ \bar{x}_i(t), & RTT_{min,i} \leq \bar{x}_i(t) \leq RTT_{max,i}, i = 1, \ldots, n, r \\ RTT_{min,i}, & \bar{x}_i(t) < RTT_{min,i} \end{cases} \tag{12}$$

The reason why a negative signal may occur could e.g. be inconsistent combinations of the round trip delay difference and round trip reference sum signals. This way, the saturation serves as a safety net for the delay aligning round trip delay controller.

Each of the so obtained single path round trip delay reference signals become the input signal to one single path controller SPC, for each data path. This controller is, as such, described in prior art and summarized in a following subsection. Here, it is sufficient to state that the output of each single path controller is a single path round trip delay:

$$\check{T}_{RTT,i}(t), i=1, \ldots n, r. \tag{13}$$

This is really the end of the actual physical control loop. For further use below, it is however relevant to describe in detail how these are combined into the delay difference and delay sum signals that affect the application layer, in response to the corresponding reference values. These relations follow directly from the block diagram of FIG. 6 and they are:

$$\check{T}_{RTT,skew,i}(t) = \check{T}_{RTT,i}(t) - \check{T}_{TRR,r}(t), i=1, \ldots, n, \tag{14a}$$

$$\check{T}_{RTT,sum}(t) = \Sigma_{i=1}^{n} \check{T}_{RTT,i}(t) + \check{T}_{RTT,r}(t). \tag{14b}$$

In order to define global stability further, it needs to be noted that in the present disclosure global stability is so called global input-output stability. This stability is defined here using so called $L_2$-stability. A signal $\beta(t) \in L_2$ whenever $$\int_0^\infty \beta^2(t)dt < \infty. \tag{15}$$

To define the global stability of the control system of FIG. 6, it is then first assumed that the reference signals:

$$\check{T}_{RTT,skew,i}^{ref}(t) \epsilon L_2, i=1, \ldots, n, \tag{16}$$

$$\check{T}_{RTT,sum,r}^{ref}(t) \epsilon L_2. \tag{17}$$

The control system of FIG. 6 is then $L_2$-stable, if the above assumption implies that the output signals:

$$\check{T}_{RTT,skew,i}(t) = \check{T}_{RTT,i}(t) - \check{T}_{RTT,r}(t) \epsilon L_2, i=1, \ldots, n, \tag{18}$$

$$\check{T}_{RTT,sum}(t) = \Sigma_{i=1}^{n} \check{T}_{RTT,i}(t) + \check{T}_{RTT,r}(t) \epsilon L_2. \tag{19}$$

The global stability can be explained by first noting that in case a signal $\beta(t) \in L_2$ it cannot consist of a signal that grows without limit when time tends to infinity, or a sustained oscillation, because then the integral would not be finite, or it would not have a limiting value, i.e. in the latter case it would not exist. Therefore, if the output signals belong to $L_2$ the control system cannot transform reference signals in $L_2$, that are hence not sustained oscillations or signals that grow without limit, rather signals that tend to zero when time tends to infinity, into signals that are not in $L_2$. In other words the control system cannot have a destabilizing effect on the incoming signals, and it is globally stable using common language.

An embodiment of the round trip reference computation mechanism R will be described here below. To construct the reference computation mechanism, the following vector quantities are defined:

$$\check{T}_{RTT,skew}^{ref}(t) = (\check{T}_{RTT,skew,1}^{ref}(t) \ldots \check{T}_{RTT,skew,n}^{ref}(t) \\ \check{T}_{RTT,sum,r}^{ref}(t))^T \quad (20)$$

$$\check{x}(t) = (\check{x}_1(t) \ldots \check{x}_n(t) \check{x}_r(t))^T \quad (21)$$

$$\check{T}_{RTT}^{ref}(t) = (\check{T}_{RTT,1}^{ref}(t) \ldots \check{T}_{RTT,n}^{ref}(t) \check{T}_{RTT,r}^{ref}(t))^T \quad (22)$$

$$\check{T}_{RTT}(t) = (\check{T}_{RTT,1}(t) \ldots \check{T}_{RTT,n}(t) \check{T}_{RTT,r}(t))^T \quad (23)$$

$$\check{T}_{RTT,skew}(t) = (\check{T}_{RTT,skew,1}(t) \ldots \check{T}_{RTT,skew,n}(t) \check{T}_{RTT,sum,r}(t))^T. \quad (24)$$

The stationary relation between the input and output of FIG. 6 is then computed, assuming that the static gain of each of the single path controllers is given by $g_0$, and that the saturation of FIG. 6 is inactive. The equations above give:

$$\check{T}_{RTT,skew}(t) = \begin{pmatrix} 1 & \cdots & 0 & -1 \\ \vdots & \ddots & & \vdots \\ 0 & \cdots & 1 & -1 \\ 1 & \cdots & 1 & -1 \end{pmatrix} g_0 I_{n+1} R \check{T}_{RTT,skew}^{ref}(t). \quad (25)$$

To determine R it is noted that if the following condition hold at all times, the right reference computation mechanism must be in place:

$$\check{T}_{RTT,skew}(t) = \check{T}_{RTT,skew}^{ref}(t). \quad (26)$$

This leads to the matrix equation:

$$\begin{pmatrix} 1 & \cdots & 0 & -1 \\ \vdots & \ddots & & \vdots \\ 0 & \cdots & 1 & -1 \\ 1 & \cdots & 1 & -1 \end{pmatrix} g_0 I_{n+1} R = I_{n+1}. \quad (27)$$

The equation can in fact be analytically solved, resulting in;

$$R = \frac{1}{g_0} \frac{1}{n+1} \begin{pmatrix} n & \cdots & -1 & 1 \\ \vdots & \ddots & & \vdots \\ -1 & \cdots & n & 1 \\ -1 & \cdots & -1 & 1 \end{pmatrix}. \quad (28)$$

In other words, in one embodiment of the method for delay alignment in a multi-point communication system, the reference values of round trip time for the n+1 signalling paths are thus calculated as a linear combination of the n reference values of round trip time skews and the reference value of a sum of round trip times.

In other words, in one further embodiment of the method for delay alignment in a multi-point communication system, the reference values of round trip time for the n+1 signalling paths are calculated as:

$$\check{T}_{RTT}^{ref}(t) = R \check{T}_{RTT,skew}^{ref}(t), \text{ with the definitions as presented here above.}$$

It can be noted that mainly integer multiplications additions and subtractions are needed to multiply with a vector, a fact that contributes to the computational complexity advantage of the delay aligning controller.

As can be noted from the above description, the different steps are described to be performed at a specific time t. However, since the process of communication of messages typically is a continuous operation, whereby the steps described above are continuously repeated, in particular the control performing step S20, and the preferred additional steps S30 and S40.

In some implementations, the original reference values of RTT skews and the sum of RTTs over all of the n+1 signalling paths may be fixed values, which means that also the determined RTT reference values for the n+1 signaling paths become fixed. In such implementations, the step S10 may be performed only once.

However, in other implementations, also the step S10 can be performed repeatedly opening up for time varying input reference values.

In other words, in one embodiment, the reference values of RTT skews between the respective signalling path and the single reference signalling path, as well as the reference value of the sum of RTTs over all of the n+1 signalling paths are varying with time.

In one embodiment, the single path controllers are instances of the controller described an analyzed in T. Wigren and R. Karaki, "Globally stable wireless data flow control", IEEE Trans. Contr. Network Systems, vol. 5, no. 1, pp. 469-478, 2018.

Since such single path controllers, as such, are known, only a brief description of the controller and its properties are given here. The index relating to the particular data path is removed for notational convenience.

Figure 7:
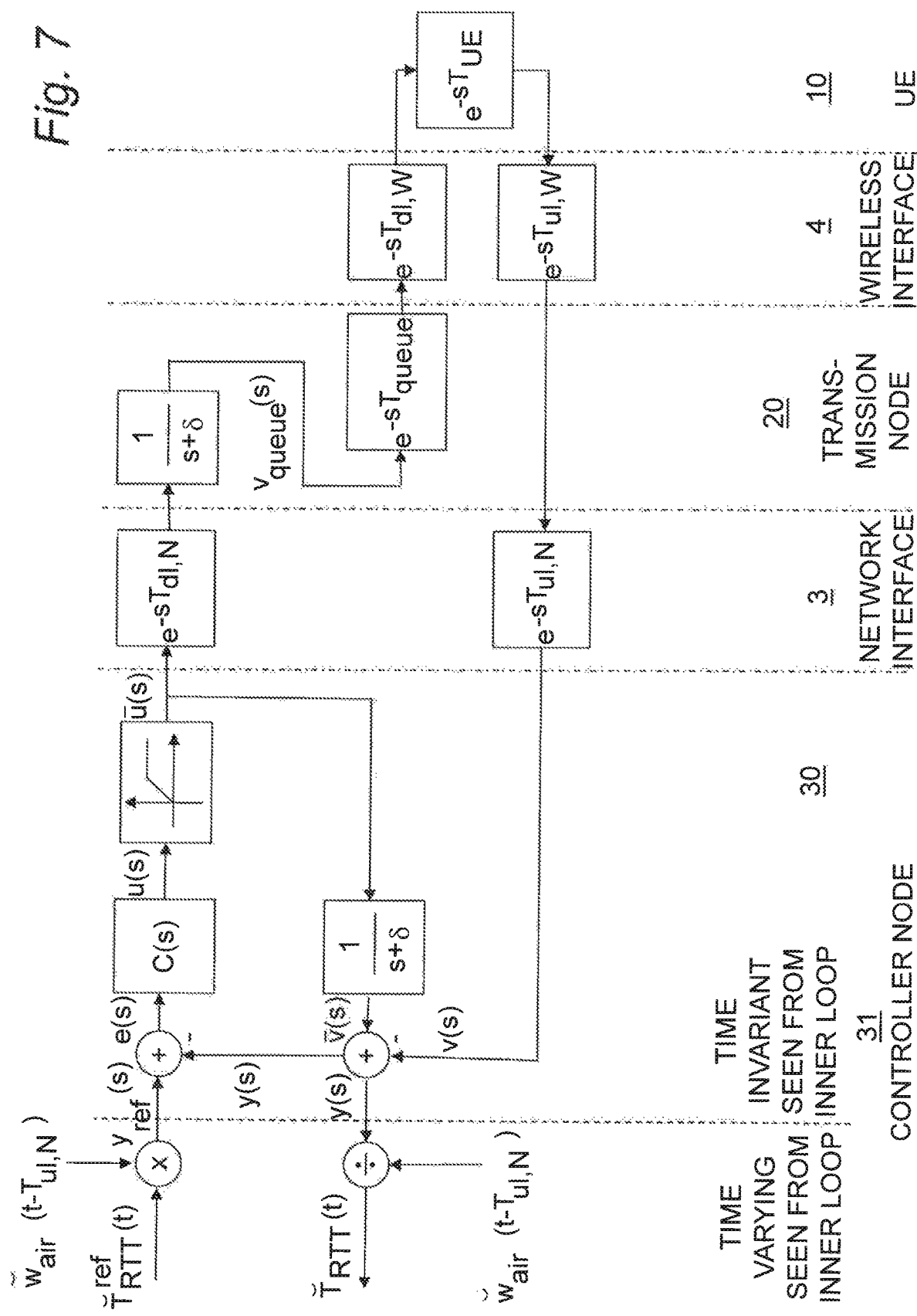
FIG. 7 is a block diagram of an embodiment of one single data path controller.

As can be seen in FIG. 7, the controller is located in the controller node 31, where also the round trip delay aligning controller of FIG. 6 is located. The controller input is the round trip reference value $\check{T}_{RTT}^{ref}(t)$. This is transformed to a "data items in flight" reference value by a division with the scheduled air interface rate, $\check{w}_{air}(t-T_{ul,N})$, which is signaled from the transmission node, delayed by the networked interface delay $T_{ul,N}$. The data item in flight reference is compared to the measured data items in flight signal y(s) to give the control error e(s). Note that here the description switches from the time domain to the frequency domain represented by the Laplace transform variable s. The controller filter C(s) produces the control signal u(s) using linear filtering. The control signal is then saturated to ensure that it is nonnegative. The resulting control signal $\bar{u}(s)$ is the data rate by which data items are sent over the network interface 3 to the transmission queue of the transmission node 20, i.e. typically the radio base station, where the data item number $v_{queue}(s)$ is obtained by leaky integration in the filter $1/(s+\delta)$. The leakage may be caused by an overlayed AQM algorithm, see T. Wigren and R. Karaki, "Globally stable wireless data flow control", IEEE Trans. Contr. Network Systems, vol. 5, no. 1, pp. 469-478, 2018. When en route to the UE 10 and back (in terms of an acknowledgement message of the data item number) over the wireless interface 4 the data item number is subject to a number of delays, represented by exponentials in the Laplace operator s, see FIG. 7. The delays include the downlink network interface delay $T_{dl,N}$, the transmission queue delay $T_{queue}$ due to the data item dwell time in the queue, the downlink wireless delay $T_{dl,W}$, the UE processing delay $T_{UE}$, the uplink wireless delay $T_{ul,W}$ and the uplink network delay $T_{ul,N}$. The data item number v(s) is then finally received in the controller node where it is combined with the latest sent data item number $\bar{v}(s)$ to produce the number of data items in flight, y(s). A multiplication with the scheduled air interface rate produces the momentary round trip delay of the single data path, $\check{T}_{RTT}(t)$.

In other words, in one embodiment, the separate, globally stable, control of data signalling in each single signalling path is performed by using a round trip time reference value $\check{T}_{RTT}^{ref}(t)$ as controller input, which is transformed into a data item in flight reference value $y_{ref}(s)$ by division with a scheduled air interface rate $\check{w}_{air}(t-\bar{T}_{ul,N})$ into a frequency domain, which data item in flight reference value $y_{ref}(s)$ is compared with measured data item in flight y(s) and being control filtered C(s) into a control signal u(s). Preferably, the control signal u(s) is saturated to ensure that it is non-negative.

In one further embodiment, the measured data items in flight signal y(s) is based on a data item number v(s) of a last received data item and latest sent data item number $\bar{v}(s)$.

Figure 8:
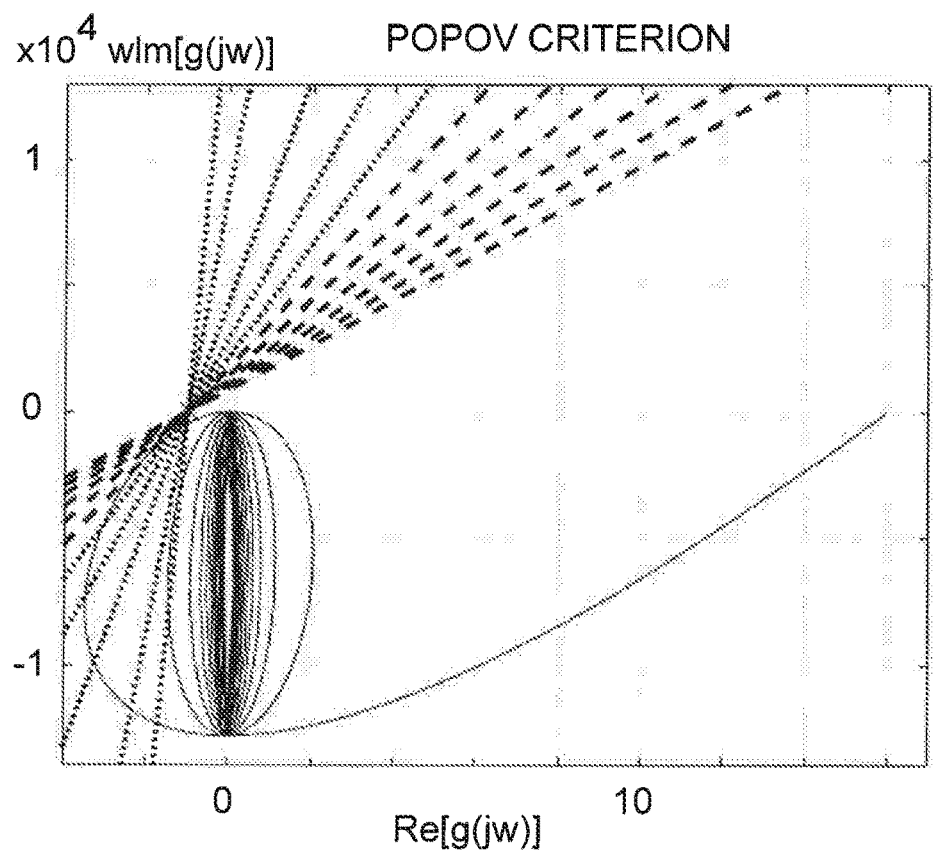
FIG. 8 is an illustration of the Popov criterion proving global unconditional stability.

It is proved in T. Wigren and R. Karaki, "Globally stable wireless data flow control", IEEE Trans. Contr. Network Systems, vol. 5, no. 1, pp. 469-478, 2018, that if proportional control is used (C(s)=C) and if δ→0, then each individual single path controller is globally stable for any C>0 and any round trip delay of the single path controller loop. FIG. 8 illustrates the stability of each single path controller of such a design, by means of the graphical Popov criterion that is well known in prior art, see the references in the above publication. The curve is the so called Popov curve that is a function of the single path controller loop gain, which is frequency dependent. The lines are so called Popov lines that are allowed to have any positive slope, but are restricted to pass through −1 on the real axis. The Popov theorem states that if one single such Popov line can be found such that the Popov curve (a function of the loop gain) is entirely to the right of the Popov line, then the control system is globally stable. Now, a detailed analysis reveals that the Popov curve intersects the real axis only in the origin and in the originating point on the positive real axis, the rest of the curve is always strictly in the lower complex plane. It is then geometrically obvious that a Popov line can always be found such that the Popov criterion is met (simply rotate the line around −1+j0 until the curve is to the right). Hence global stability follows.

Now, since there are no dynamic blocks other than the single path controllers in FIG. 6, and since there are no feedback signal connections in FIG. 6, it follows that also the n-node delay aligning controller is globally stable, provided that all single data path controllers meet the conditions of the Popov criterion. This means that the disclosed delay aligning controller of FIG. 6 for n+1 data paths, have ideal stability properties. It can never become unstable, irrespective of the delays that may affect the system. This means that there are very strong guarantees that the controller will always perform well in a practical deployment. The value of this property cannot be underestimated since thousands of controllers may run in parallel in future 5G nodes, serving critical feedback control applications at higher layers.

In order to correctly measure the round trip delay of each data path in each of the single data path controllers without additional concerns, the data path has to be the same in both uplink or downlink, or at least that the data path of the downlink and uplink transmissions are known. See FIG. 6 and FIG. 7 for the subsequent discussion.

In one embodiment, this can be achieved by a restriction being enforced that the UE must send back acknowledgments/non-acknowledgements (ack/nack) regarding the reception of a data item, using the same data path as was used in the downlink for sending the data item to the UE. This should then preferably be introduced in the 3GPP standard.

In a slightly different approach in another embodiment, a restriction being enforced that the UE must send back acknowledgments/non-acknowledgements (ack/nack) regarding the reception of a data item, using a specific data path. This specific data path may be selected according to a predetermined relationship with the downlink for sending the data item to the UE. (The embodiment above then becomes a special case of this, where the relationship for all downlink path leads to a selection of the same path.)

When different (but known) paths are used for uplink acknowledgements compared to the original message, the delays introduced in the uplink of FIG. 7 has to be adapted accordingly. The wireless interface 3 and network interface 4 may thereby be different in the uplink compared to the downlink. This does not impose any additional computational efforts as long as the relationship between the paths is non-varying.

In other words, in one embodiment an acknowledgement signalling associated with the signalling in each single signalling path is performed in an acknowledgement signalling path. The acknowledgement signalling path is selected according to a predetermined relationship with each single signalling path.

The implementation of the above signaling restriction may require notification to the UE about the travelled path of each data item, so that the ack/nack of the data item can be sent back using the correct data path. One way to handle this is to add a data path identifier as an additional information element to the data item. This identifier may consist of an (encoded) data path number, and having a range [0, maxNumberOfDataPaths], where maxNumber OfDataPaths may be decided e.g. in the standard or according to a set-up agreement. The addition of the data path identifier to the data item can be added in several places in the signal chain. It could e.g. be added at the data source, where the data item is first created, i.e. at a node before it reaches the nodes of FIG. 6. It could also be added at a server, in between the data source node and the nodes of FIG. 6. Furthermore, it could be added in the controller node, before transmission over the network interface to the selected transmission node. Note that there may be a separate function outside the delay aligning controller that performs this addition of the data path identifier. The data path identifier could also be added in the transmission node, before transmission over the wireless interface to the UE. Finally, the data path could be detected in the UE, using other types of functionality for the detection of the data path.

There is also another possibility that allows data item ack/nacks to be sent over any data path. This means that all combinations of downlink delays over data path I, with uplink delays over data path j will occur. However, by addition of an uplink data path indicator that states which data path the uplink transmission is using for every data item, a system of equations can be set up and the round trip delays can be solved for.

The uplink data path indicator could consist of an (encoded) data path number, and having a range [0, maxNumberOfUplinkDataPaths], where maxNumber OUplinkfDataPaths preferably may be decided in the standard. The uplink data path indication could be added in several places in the signal chain, e.g. in the UE, before transmission over the air interface. The uplink data path indication could also be added in the transmission node, receiving the ack/nack.

Furthermore, it could also be added in the controller node, by registering the incoming network interface.

Note that the present alternative may be attractive in situations where the downlink transmission is using a node working at millimeter wave carrier frequencies, but where the uplink transmission is performed at lower carrier frequencies for coverage reasons.

In other words, in one embodiment, an acknowledgement signalling associated with the signalling in each single signalling path comprises an indication of a signalling path of the acknowledgement signalling.

To understand how the round trip time measurements are retrieved it is noted that the measurements of the round trip times over downlink data path i and uplink data path j, $\check{T}_{RTT,i,j}(t)$ can be expressed in terms of the downlink delay $\check{T}_{RTT,dl,i}(t)$ and the uplink delay $\check{T}_{RTT,ul,j}(t)$ with the following matrix equation which collects measurements over a window in time where the downlink and uplink parts of the round trip delays are assumed to be roughly constant $$\begin{pmatrix} \check{T}_{RTT,i_1,j_1}(t_1) \\ \check{T}_{RTT,i_2,j_2}(t_2) \\ \vdots \\ \check{T}_{RTT,i_{N-1},j_{N-1}}(t_{N-1}) \\ \check{T}_{RTT,i_N,j_N}(t_N) \end{pmatrix} = \begin{pmatrix} \cdots & 1 & 0 & \cdots & 0 & 1 \\ & & \vdots & & & \\ & & \vdots & & & \\ & & \vdots & & & \\ \cdots & & 1 & \cdots & 1 & \cdots \end{pmatrix} \begin{pmatrix} \check{T}_{RTT,dl,1}(t_1) \\ \vdots \\ \check{T}_{RTT,dl,n}(t_1) \\ \check{T}_{RTT,ul,1}(t_1) \\ \vdots \\ \check{T}_{RTT,ul,n}(t_1) \end{pmatrix} + e(t_1) \quad (29)$$

$$= A \begin{pmatrix} \check{T}_{RTT,dl,1}(t_1) \\ \vdots \\ \check{T}_{RTT,dl,n}(t_1) \\ \check{T}_{RTT,ul,1}(t_1) \\ \vdots \\ \check{T}_{RTT,ul,n}(t_1) \end{pmatrix} + e(t_1).$$

These equations are in standard linear regression form and a least squares solution becomes:

$$\begin{pmatrix} \hat{\check{T}}_{RTT,dl,1}(t_1) \\ \vdots \\ \hat{\check{T}}_{RTT,dl,n}(t_1) \\ \hat{\check{T}}_{RTT,ul,1}(t_1) \\ \vdots \\ \hat{\check{T}}_{RTT,ul,n}(t_1) \end{pmatrix} = (A^T A)^{-1} A^T \begin{pmatrix} \check{T}_{RTT,i_1,j_1}(t_1) \\ \check{T}_{RTT,i_2,j_2}(t_2) \\ \vdots \\ \check{T}_{RTT,i_{N-1},j_{N-1}}(t_{N-1}) \\ \check{T}_{RTT,i_N,j_N}(t_N) \end{pmatrix}. \quad (30)$$

The round trip delays can be reconstructed after solving the system of equations, by a simple addition of the downlink and uplink components. Note that the matrix A has two ones in every row, with the rest of the elements being 0.

In other words, in one embodiment, the separate, globally stable, control of data signalling in each single signalling path comprises collection of RTT measurements for different combinations of uplink and downlink signalling paths during a time window. A linear regression is performed based on the collected round trip time measurements, for achieving separate round trip time contributions for all used downlink and uplink signalling paths.

In a further embodiment, the separate, globally stable, control of data signalling in each single signalling path further comprises computing of a representative RTT associated with each downlink signalling path in dependence of the contributions of uplink signalling paths used in connection with each separate downlink signalling path. The representative RTT is used as feedback in the separate, globally stable, control of data signalling in each single signalling path.

Numerical examples of the performance of the round trip delay aligning controller, as such, can be found in "Globally stable wireless data flow control" by T. Wigren and R. Karaki, IEEE Trans. Contr. Network Systems, vol. 5, no. 1, pp. 469-478, 2018.

As used herein, the non-limiting terms "User Equipment (UE)", "station (STA)" and "wireless communication device" or "wireless device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station", the term "wireless device" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs (NB), or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided an arrangement configured to perform globally stable delay alignment in a multi-point communication system. The network node is configured to determine a respective reference value of round trip time for n+1 signalling paths in the multi-point communication system, where n>0. This determination is performed using n reference values of round trip time skews between a respective signalling path and a single reference signalling path of the n+1 signalling paths, and a reference value of a sum of round trip times over all of the n+1 signalling paths as exclusive input values. The respective reference values of round trip times are limited within a predetermined allowed interval for round trip times. The network node is further configured to perform a separate, globally stable, control of data signalling in each single one of the n+1 signalling paths based on the respective reference values of round trip times.

Figure 9:
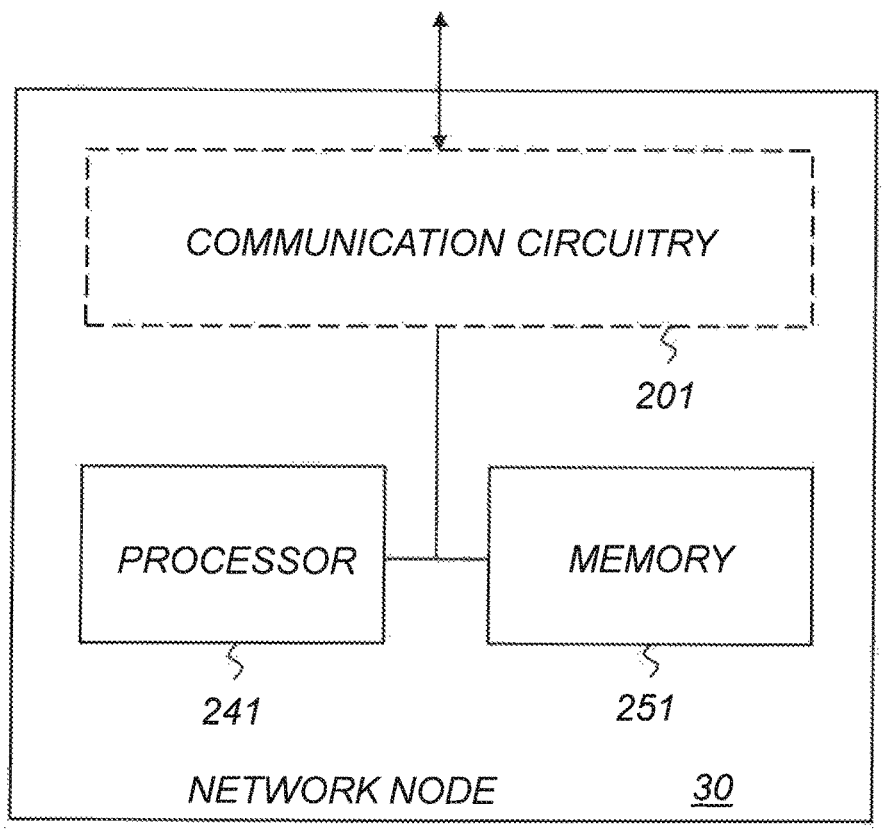
FIG. 9 is a schematic block diagram illustrating an embodiment of a network node.

FIG. 9 is a schematic block diagram illustrating an example of a network node 30, based on a processor-memory implementation according to an embodiment. In this particular example, the network node 30 comprises a processor 241 and a memory 251, the memory 251 comprising instructions executable by the processor 241, whereby the processor 241 is operative to compute the respective reference value of round trip time for n+1 signalling paths in the multi-point communication system and to perform the separate, globally stable, control of data signalling in each single one of said n+1 signalling paths.

The network node 30 may also include a communication circuitry 201. The communication circuitry 201 may include functions for wired and/or wireless communication with other devices and/or network nodes in the network. In a particular example, the communication circuitry 201 may be based on radio circuitry for communication with one or more other nodes, including transmitting and/or receiving information. The communication circuit 201 may be interconnected to the processor 241 and/or memory 251. By way of example, the communication circuit 201 may include any of the following: a receiver, a transmitter, a transceiver, input/output (I/O) circuitry, input port(s) and/or output port(s).

Figure 10:
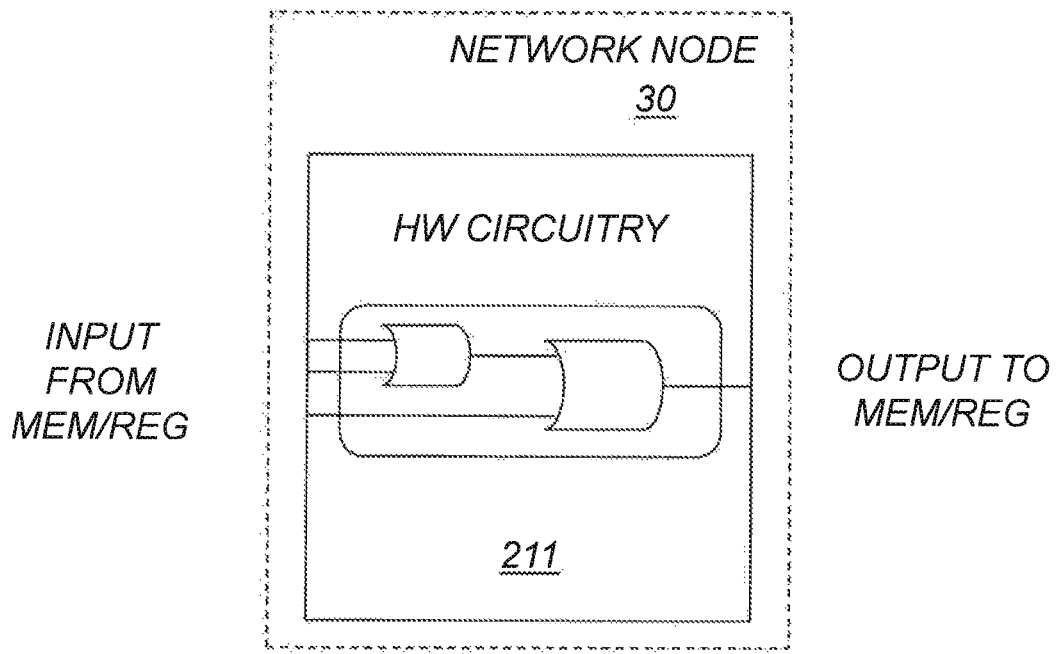
FIG. 10 is a schematic block diagram illustrating an embodiment of a network node based on a hardware circuitry implementation.

FIG. 10 is a schematic block diagram illustrating another example of a network node 30, based on a hardware circuitry implementation according to an embodiment. Particular examples of suitable hardware (HW) circuitry 211 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 11:
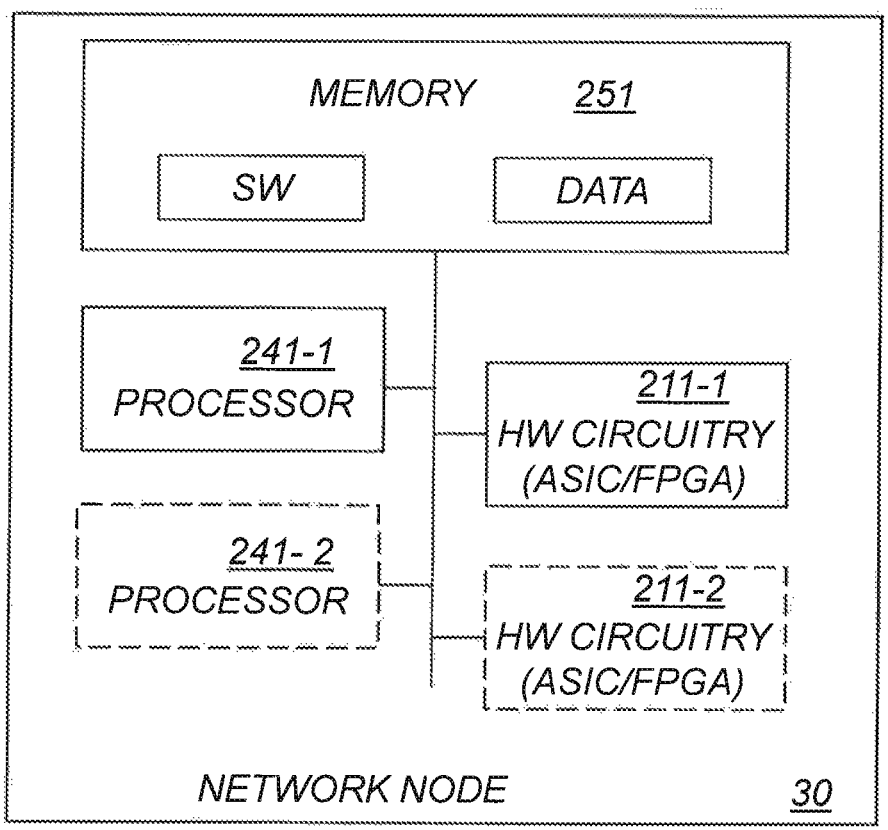
FIG. 11 is a schematic block diagram illustrating another embodiment of a network node based on combination of both processor and hardware circuitry.

FIG. 11 is a schematic block diagram illustrating yet another example of a network node 30, based on combination of both processor(s) 241-1, 241-2 and hardware circuitry 211-1, 211-2 in connection with suitable memory unit(s) 251. The network node 30 comprises one or more processors 241-1, 241-2, memory 251 including storage for software and data, and one or more units of hardware circuitry 211-1, 211-2 such as ASICs and/or FPGAs. The overall functionality is thus partitioned between programmed software (SW) for execution on one or more processors 241-1, 241-2, and one or more pre-configured or possibly reconfigurable hardware circuits 211-1, 211-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 12:
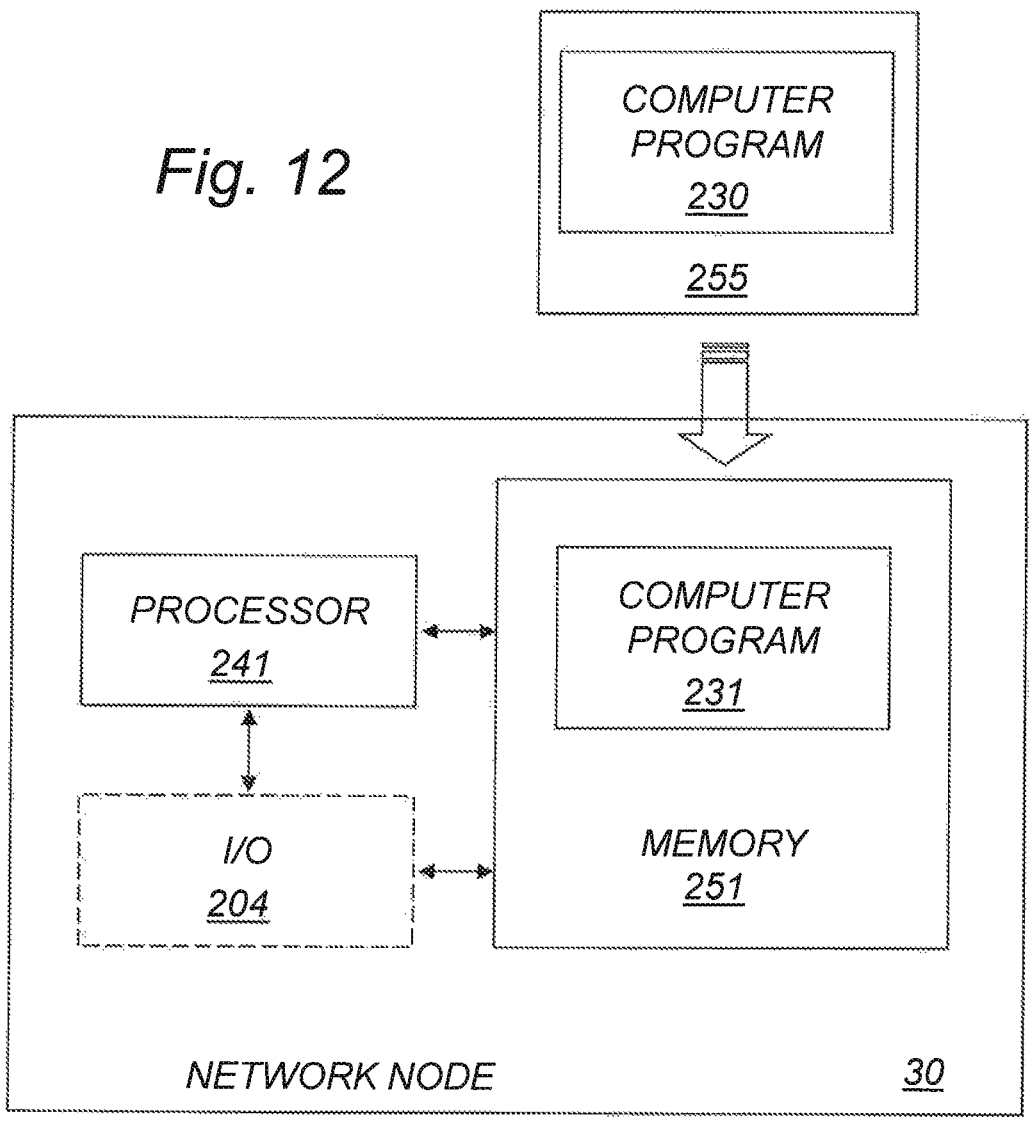
FIG. 12 is a schematic diagram illustrating an embodiment of a computer-implementation of a network node.

FIG. 12 is a schematic diagram illustrating an embodiment of a computer-implementation of a network node 30. In this particular embodiment, at least some of the steps, functions, procedures, modules and/or blocks described herein are implemented in a computer program 231, which is loaded into the memory 251 for execution by processing circuitry including one or more processors 241. The processor(s) 241 and memory 251 are interconnected to each other to enable normal software execution. An optional input/output device 204 may also be interconnected to the processor(s) 241 and/or the memory 251 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 241 is thus configured to perform, when executing the computer program 231, well-defined processing tasks such as those described herein. The terms "processing circuitry" and "processor" will in the present disclosure be used as synonymous expressions.

The processing circuitry does not have to be dedicated to only execute the above-described steps, functions, procedure and/or blocks, but may also execute other tasks.

In a particular embodiment, the computer program 231 comprises instructions, which when executed by at least one processor 241, cause the processor(s) 241 to determine a respective reference value of round trip time for n+1 signalling paths in the multi-point communication system, where n>0, using n reference values of round trip time skews between a respective signalling path and a single reference signalling path of said n+1 signalling paths, and a reference value of a sum of round trip times over all of said n+1 signalling paths as exclusive input values. The respective reference values of round trip times being limited within a predetermined allowed interval for round trip times. The instructions when executed by the at least one processor 241, further cause the processor(s) 241 to perform a separate, globally stable, control of data signalling in each single one of said n+1 signalling paths based on the respective reference values of round trip times.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 230; 231 may be realized as a computer program product, which is normally carried or stored on a computer-readable medium 255; 251, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 13:
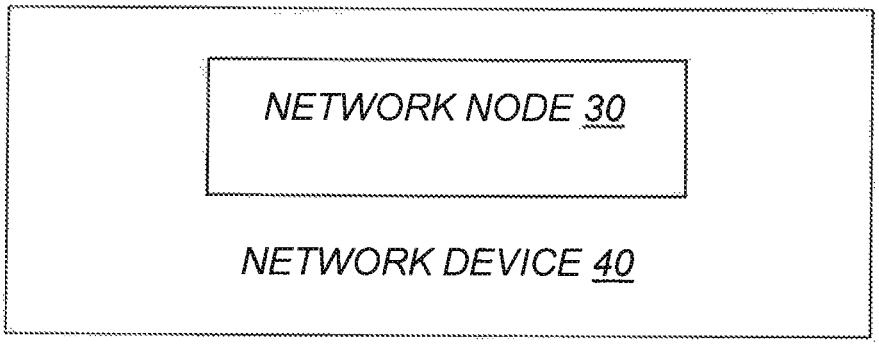
FIG. 13 is a schematic block diagram illustrating an embodiment of a network device.

FIG. 13 is a schematic block diagram illustrating an example of a network device (ND) 40 comprising a network node 30 according to any of the embodiments.

According to an aspect, there is provided a network device 40 comprising a network node 30 as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a communication unit 10 in a wireless communication system, wherein the communication unit 10 comprises a network node 30 as described herein. The communication unit may be any suitable communication unit in the wireless communication system. By way of example, the communication unit may be a wireless communication device such as a UE, STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 14:
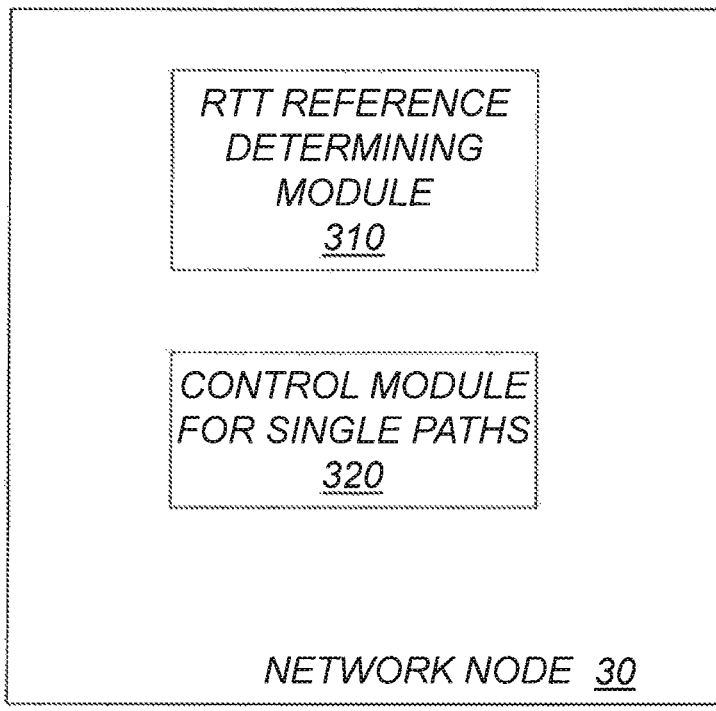
FIG. 14 is a schematic diagram illustrating an embodiment of a network node.

FIG. 14 is a schematic diagram illustrating an example of a network node 30 for delay alignment in a multi-point communication system. The network node 30 comprises an RTT reference determining module 310, for determining of a respective reference value of round trip time for n+1 signalling paths in said multi-point communication system, where n>0. The determination is performed using n reference values of round trip time skews between a respective signalling path and a single reference signalling path of said n+1 signalling paths, and a reference value of a sum of round trip times over all of said n+1 signalling paths as exclusive input values. The respective reference values of round trip times are limited within a predetermined allowed interval for round trip times. The network node 30 further comprises a control module for single paths, for performing of a separate, globally stable, control of data signalling in each single one of the n+1 signalling paths based on the respective reference values of round trip times.

Alternatively it is possible to realize the module(s) in FIG. 14 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

Figure 15:
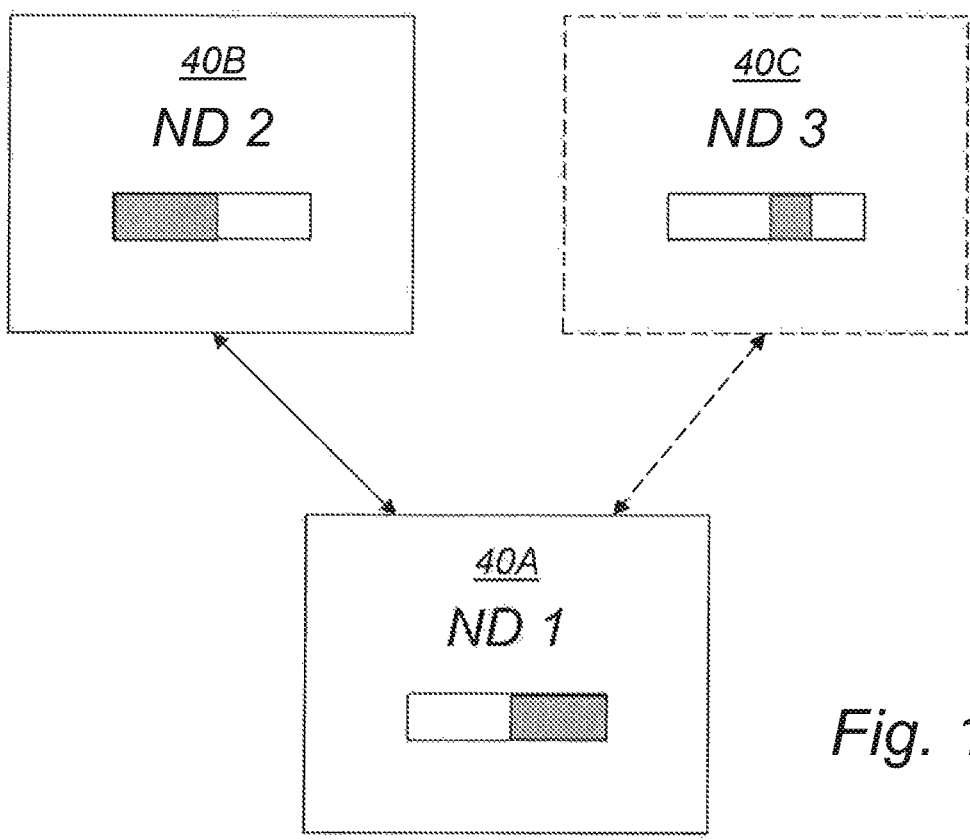
FIG. 15 is a schematic diagram illustrating a general example of functionality distribution or partition.

FIG. 15 is a schematic diagram illustrating an example of how functionality can be distributed or partitioned between different Network Devices (ND) in a general case. In this example, there are at least two individual, but interconnected network devices, ND 1 and ND 2, with reference numerals 40A and 40B, respectively, which may have different functionalities, or parts of the same functionality, partitioned between the network devices 40A and 40B. There may be additional network devices, such as ND 3, with reference numeral 40C, being part of such a distributed implementation. The network devices 40A-C may be part of the same wireless communication system, or one or more of the network devices may be so-called cloud-based network devices located outside of the wireless communication system.

Figure 16:
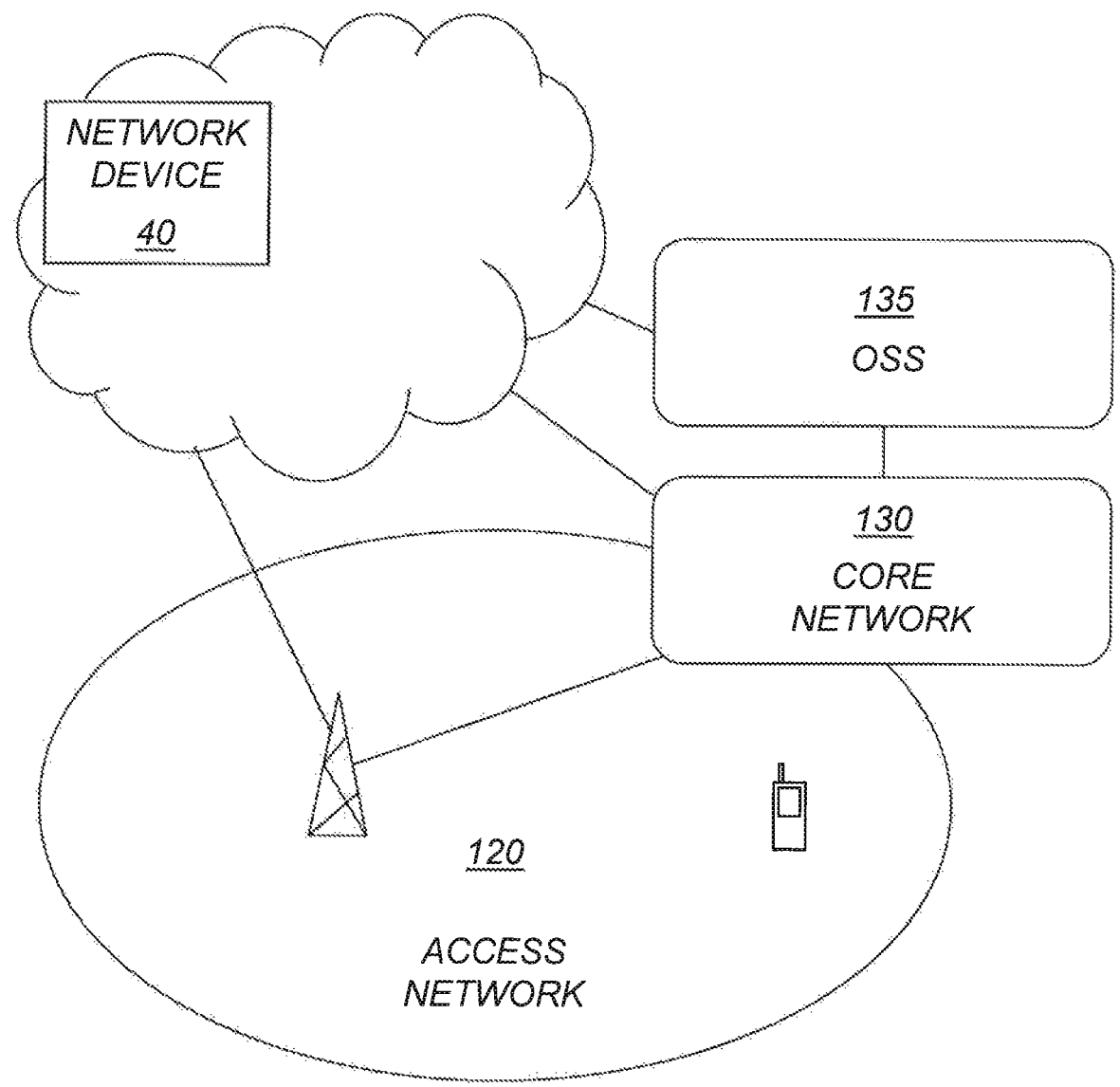
FIG. 16 is a schematic diagram illustrating an example of a wireless communication system in cooperation with one or more cloud-based network devices.

FIG. 16 is a schematic diagram illustrating an example of a wireless communication system, including an access network 120 and/or a core network 130 and/or an Operations and Support System (OSS), 135 in cooperation with one or more cloud-based network devices 40. Functionality relevant for the access network 120 and/or the core network 130 and/or the OSS system 135 may be at least partially implemented for execution in a cloud-based network device 40, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a ND. In certain embodiments of such a hybrid network device, a platform Virtual Machine (VM), such as a VM that implements functionality of a special-purpose network device, could provide for para-virtualization to the hardware present in the hybrid network device.

Figure 17:
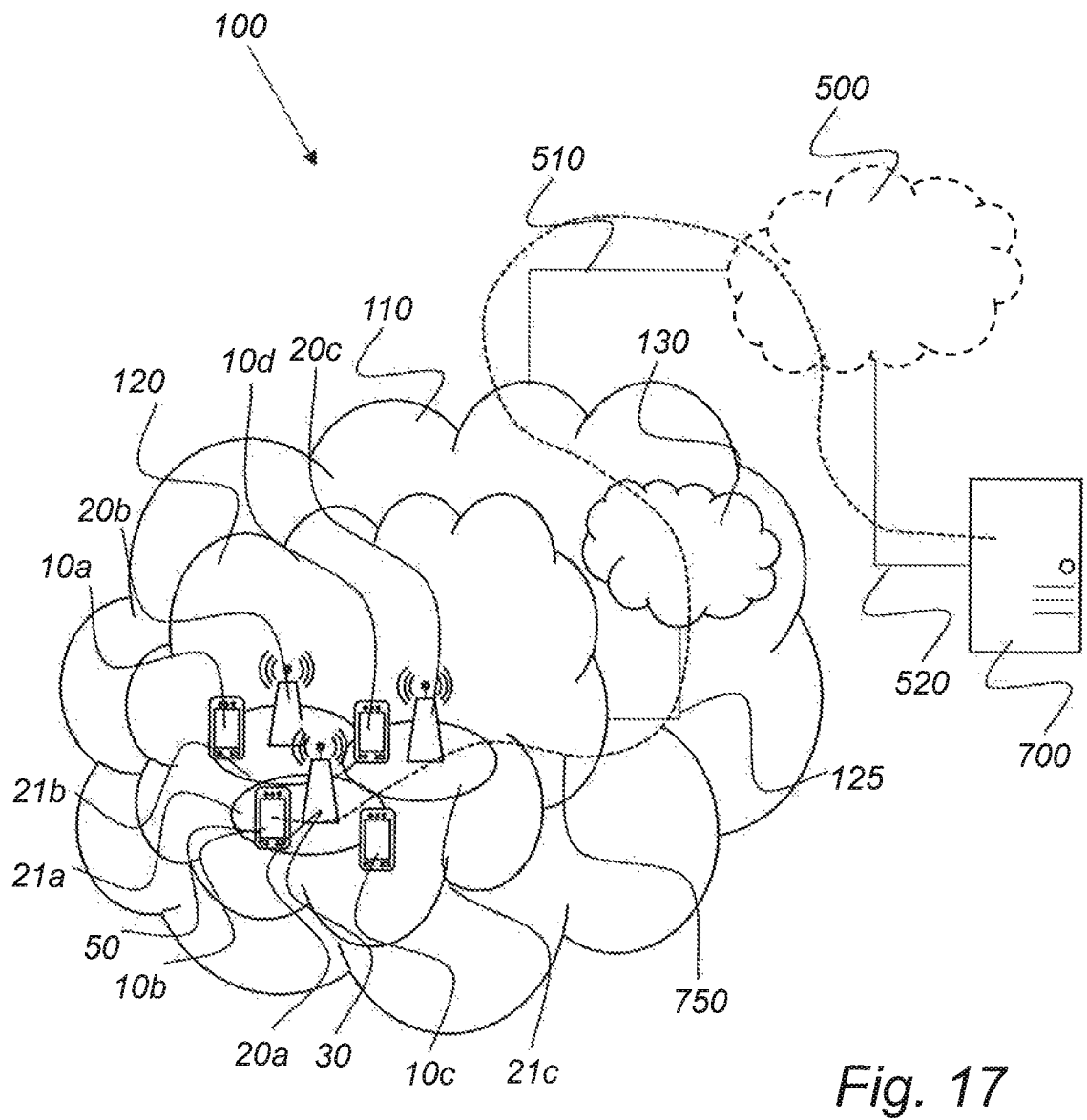
FIG. 17 schematically illustrates a telecommunication network connected via an intermediate network to a host computer.

With reference to FIG. 17, in accordance with an embodiment, a communication system 100 includes a telecommunication network 110, such as a 3GPP-type cellular network, which comprises an access network 120, such as a Radio Access Network (RAN), and a Core Network (CN) 130. The access network 120 comprises a plurality of base stations 20a, 20b, 20c, such as Node Bs (NB), evolved Node Bs (eNB), New Radio Node Bs (gNB) or other types of wireless access points, each defining a corresponding coverage area 21a, 21b, 21c. Each base station 20a, 20b, 20c is connectable to the CN 130 over a wired or wireless connection 125. A first user equipment (UE) 10a located in coverage area 21c is configured to wirelessly connect to, or be paged by, the corresponding base station 20c. A second UE 10b in coverage area 21a is wirelessly connectable to the corresponding base station 20a. While a plurality of UEs 10a-d are illustrated in this example, the disclosed embodiments are equally applicable to a situation where a sole UE is in the coverage area or where a sole UE is connecting to the corresponding base station 20.

The base station 20 is one type of a network node 30. Many operations that in a typical applications are performed in a base station 20 may alternatively be performed in another network node 30 or even in a node external to the telecommunication network 110. The devices and methods described here below as being performed in a base station 20 should be interpreted as also being possible to perform in a general network node 30.

The UE 10 is one type of a wireless device 11. Many operations that in a typical applications are performed in a UE 10 may alternatively be performed in any other wireless device 11. The devices and methods described here below as being performed in a UE 10 should be interpreted as also being possible to perform in a general wireless device 11.

The telecommunication network 110 is itself connected to a host computer 700, which may be embodied in the hardware and/or software of a standalone server, a cloud implemented server, a distributed server or as processing resources in a server farm. The host computer 700 may be under the ownership or control of a service provider, or may be operated by the service provider or on behalf of the service provider. The connections 510, 520 between the telecommunication network 110 and the host computer 700 may extend directly from the CN 130 to the host computer 700 or may go via an optional intermediate network 500. The intermediate network 500 may be one of, or a combination of more than one of, a public, private or hosted network; the intermediate network 500, if any, may be a backbone network or the Internet; in particular, the intermediate network 500 may comprise two or more sub-networks (not shown).

The communication system of FIG. 17 as a whole enables connectivity between one of the connected UEs 10a-d and the host computer 700. The connectivity may be described as an over-the-top (OTT) connection 750. The host computer 700 and the connected UEs 10a-d are configured to communicate data and/or signalling via the OTT connection 750, using the access network 120, the CN 130, any intermediate network 500 and possible further infrastructure (not shown) as intermediaries. The OTT connection 750 may be transparent in the sense that the participating communication devices through which the OTT connection 750 passes are unaware of routing of uplink and downlink communications. For example, a base station 20 may not or need not be informed about the past routing of an incoming downlink communication with data originating from a host computer 700 to be forwarded (e.g., handed over) to a connected UE 10. Similarly, the base station need not be aware of the future routing of an outgoing uplink communication originating from the UE 10 towards the host computer 700.

Example implementations, in accordance with an embodiment, of the UE, base station and host computer discussed in the preceding paragraphs will now be described with reference to FIG. 18. In a communication system 100, a host computer 700 comprises hardware 710 including a communication interface 730 configured to set up and maintain a wired or wireless connection with an interface of a different communication device of the communication system 100. The host computer 700 further comprises processing circuitry 740, which may have storage and/or processing capabilities. In particular, the processing circuitry 740 may comprise one or more programmable processors, application-specific integrated circuits, field programmable gate arrays or combinations of these (not shown) adapted to execute instructions. The host computer 700 further comprises software 720, which is stored in or accessible by the host computer 700 and executable by the processing circuitry 740. The software 720 includes a host application 722. The host application 722 may be operable to provide a service to a remote user, such as a UE 10 connecting via an OTT connection 750 terminating at the UE 10 and the host computer 700. In providing the service to the remote user, the host application 722 may provide user data which is transmitted using the OTT connection 750.

The communication system 100 further includes a base station 20 provided in a telecommunication system and comprising hardware 155 enabling it to communicate with the host computer 700 and with the UE 10. The hardware 155 may include a communication interface 150 for setting up and maintaining a wired or wireless connection with an interface of a different communication device of the communication system 100, as well as a radio interface 160 for setting up and maintaining at least a wireless connection 165 with a UE 10 located in a coverage area (not shown in FIG.

18) served by the base station 20. The communication interface 150 may be configured to facilitate a connection 151 to the host computer 700. The connection 151 may be direct or it may pass through a CN (not shown in FIG. 18) of the telecommunication system and/or through one or more intermediate networks outside the telecommunication system. In the embodiment shown, the hardware 155 of the base station 20 further includes processing circuitry 170, which may comprise one or more programmable processors, application-specific integrated circuits, field programmable gate arrays or combinations of these (not shown) adapted to execute instructions. The base station 20 further has software 156 stored internally or accessible via an external connection.

The communication system 100 further includes the UE 10 already referred to. Its hardware 185 may include a radio interface 180 configured to set up and maintain a wireless connection 165 with a base station serving a coverage area in which the UE 10 is currently located. The hardware 185 of the UE 10 further includes processing circuitry 190, which may comprise one or more programmable processors, application-specific integrated circuits, field programmable gate arrays or combinations of these (not shown) adapted to execute instructions. The UE 10 further comprises software 186, which is stored in or accessible by the UE 10 and executable by the processing circuitry 190. The software 186 includes a client application 192. The client application 192 may be operable to provide a service to a human or non-human user via the UE 10, with the support of the host computer 700. In the host computer 700, an executing host application 722 may communicate with the executing client application 192 via the OTT connection 750 terminating at the UE 10 and the host computer 700. In providing the service to the user, the client application 192 may receive request data from the host application 722 and provide user data in response to the request data. The OTT connection 750 may transfer both the request data and the user data. The client application 192 may interact with the user to generate the user data that it provides.

Figure 18:
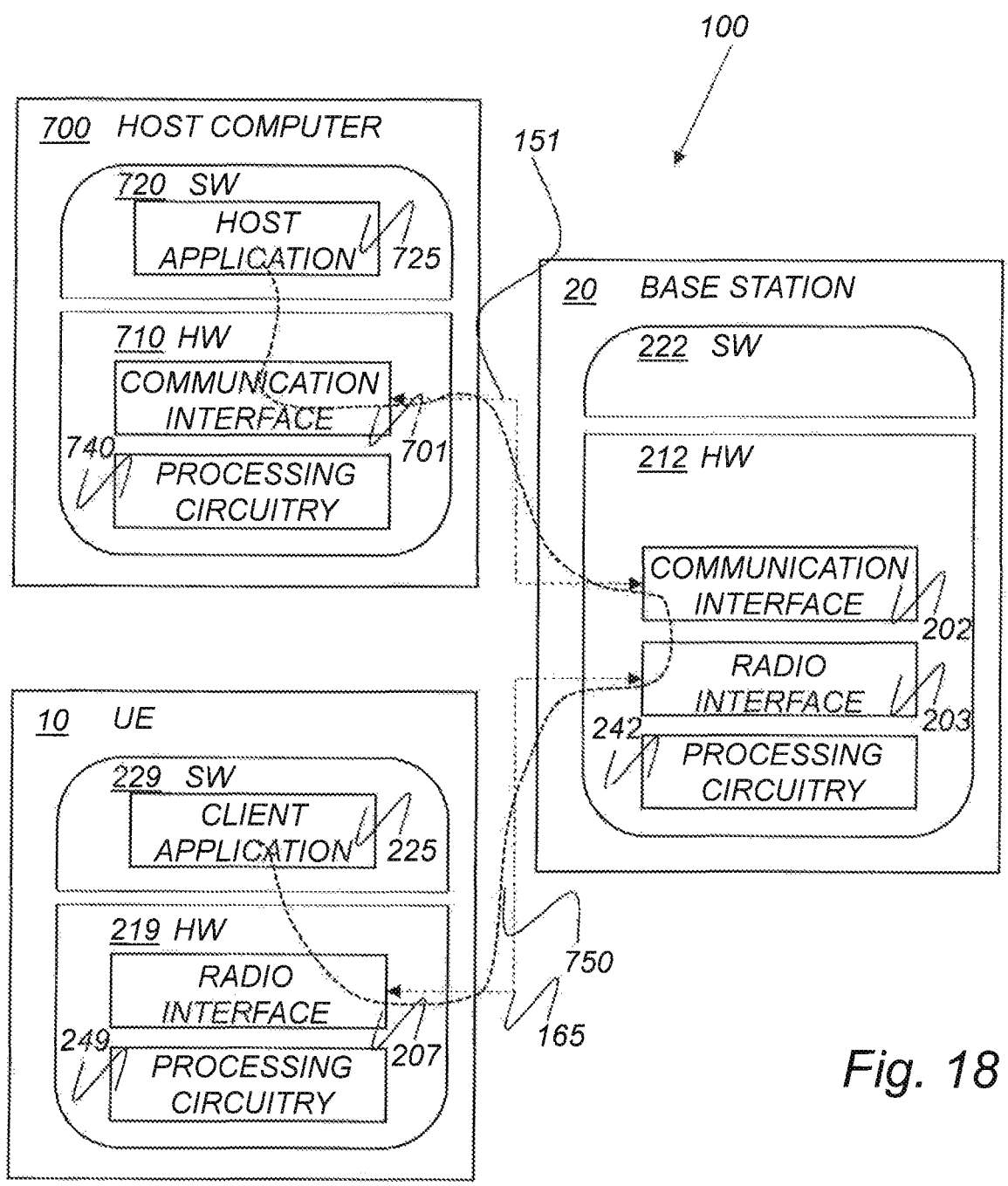
FIG. 18 is a generalized block diagram of a host computer communicating via a base station with a user equipment over a partially wireless connection.

It is noted that the host computer 700, base station 20 and UE 10 illustrated in FIG. 18 may be identical to the host computer 700, one of the base stations 20a, 20b, 20c and one of the UEs 10a-d of FIG. 17, respectively. This is to say, the inner workings of these entities may be as shown in FIG. 18 and independently, the surrounding network topology may be that of FIG. 17.

In FIG. 18, the OTT connection 750 has been drawn abstractly to illustrate the communication between the host computer 700 and the use equipment via the base station 20, without explicit reference to any intermediary devices and the precise routing of messages via these devices. Network infrastructure may determine the routing, which it may be configured to hide from the UE 10 or from the service provider operating the host computer 700, or both. While the OTT connection 750 is active, the network infrastructure may further take decisions by which it dynamically changes the routing (e.g., on the basis of load balancing consideration or reconfiguration of the network).

The wireless connection 165 between the UE 10 and the base station 20 is in accordance with the teachings of the embodiments described throughout this disclosure. One or more of the various embodiments improve the performance of OTT services provided to the UE 10 using the OTT connection 700, in which the wireless connection 165 forms the last segment. More precisely, the teachings of these embodiments may improve the delay alignment and its stability and thereby provide benefits such as increase reliability in URLLC applications and more reliable reception of streaming media content.

A measurement procedure may be provided for the purpose of monitoring data rate, latency and other factors on which the one or more embodiments improve. There may further be an optional network functionality for reconfiguring the OTT connection 750 between the host computer 700 and UE 10, in response to variations in the measurement results. The measurement procedure and/or the network functionality for reconfiguring the OTT connection 750 may be implemented in the software 720 of the host computer 700 or in the software 186 of the UE 10, or both. In embodiments, sensors (not shown) may be deployed in or in association with communication devices through which the OTT connection 750 passes; the sensors may participate in the measurement procedure by supplying values of the monitored quantities exemplified above, or supplying values of other physical quantities from which software 720, 186 may compute or estimate the monitored quantities. The reconfiguring of the OTT connection 750 may include message format, retransmission settings, preferred routing etc.; the reconfiguring need not affect the base station 20, and it may be unknown or imperceptible to the base station 20. Such procedures and functionalities may be known and practiced in the art. In certain embodiments, measurements may involve proprietary UE signalling facilitating the host computer's 700 measurements of throughput, propagation times, latency and the like. The measurements may be implemented in that the software 720 causes messages to be transmitted, in particular empty or 'dummy' messages, using the OTT connection 750 while it monitors propagation times, errors etc.

Figure 19:
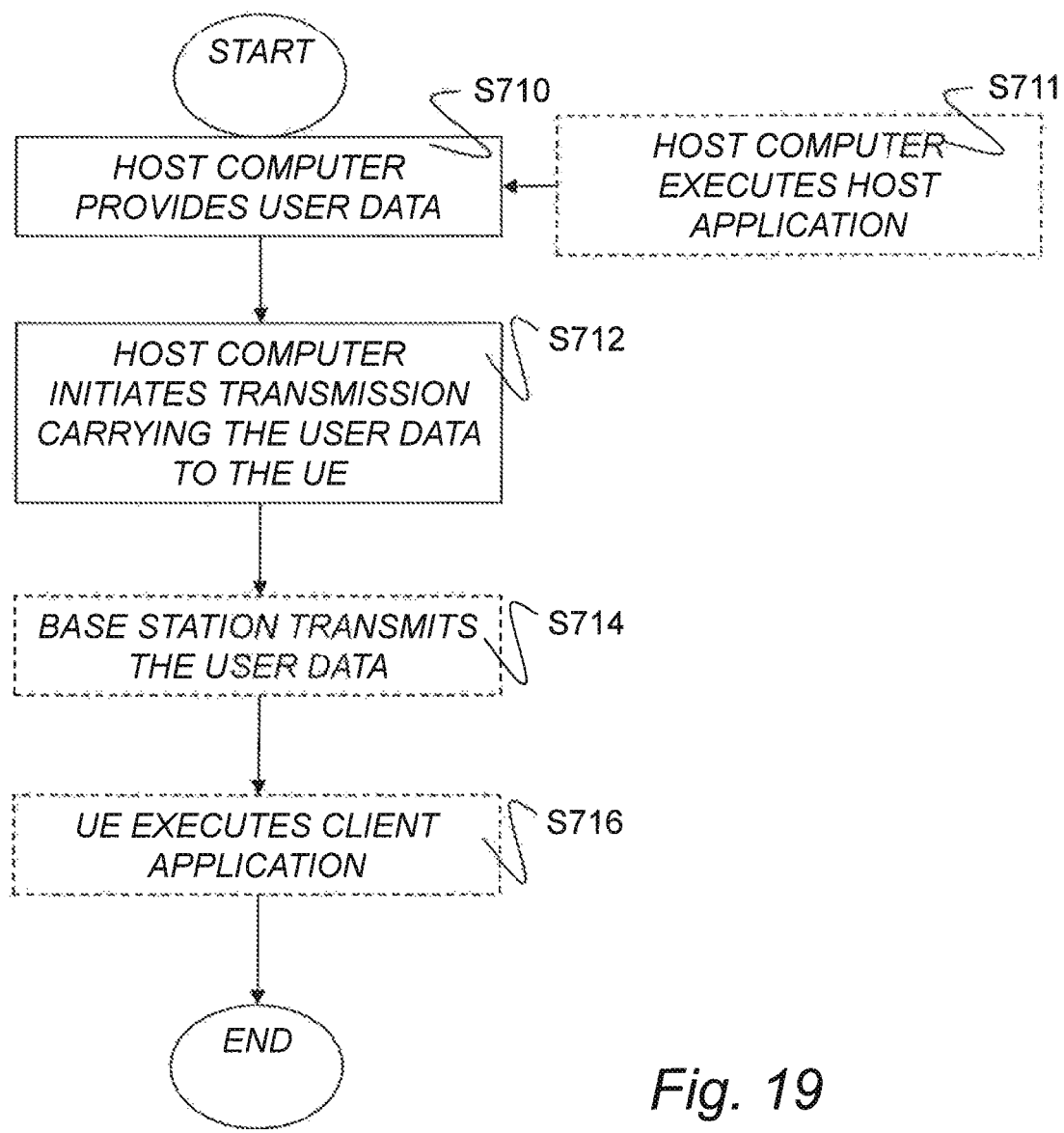
FIGS. 19-20 are flowcharts illustrating methods implemented in a communication system including a host computer, a base station and a user equipment.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In a first step S710 of the method, the host computer provides user data. In an optional substep S711 of the first step S710, the host computer provides the user data by executing a host application. In a second step S712, the host computer initiates a transmission carrying the user data to the UE. In an optional third step S714, the base station transmits to the UE the user data which was carried in the transmission that the host computer initiated, in accordance with the teachings of the embodiments described throughout this disclosure. In an optional fourth step S716, the UE executes a client application associated with the host application executed by the host computer.

Figure 20:
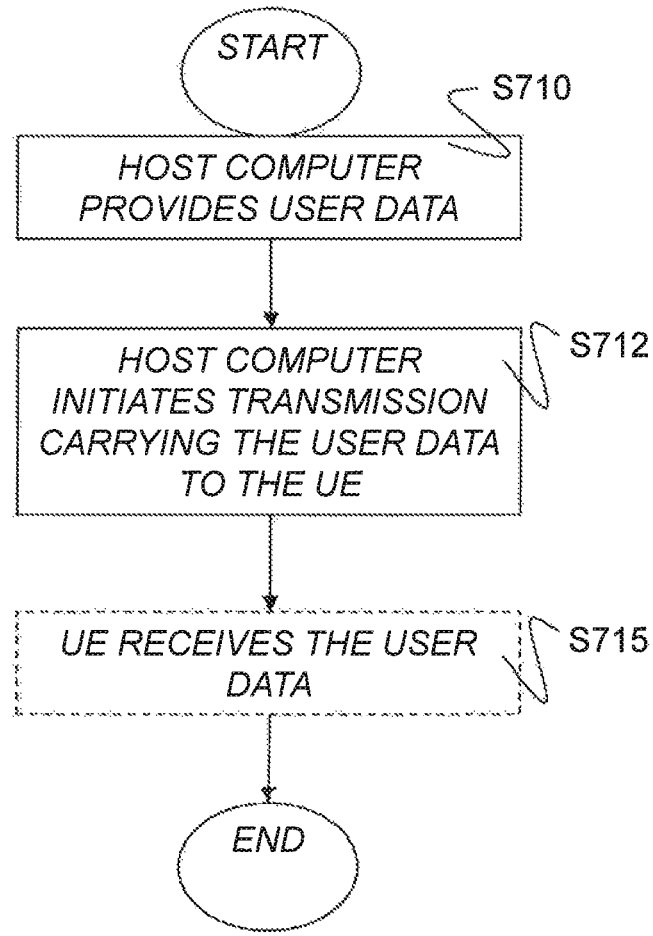

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In a first step S710 of the method, the host computer provides user data. In an optional substep (not shown) the host computer provides the user data by executing a host application. In a second step S712, the host computer initiates a transmission carrying the user data to the UE. The transmission may pass via the base station, in accordance with the teachings of the embodiments described throughout this disclosure. In an optional third step S715, the UE receives the user data carried in the transmission.

Numbered Embodiments

1. A network node configured to communicate with a wireless device, the network node comprising a radio interface and processing circuitry configured to determine a respective reference value of round trip time for n+1 signalling paths in the multi-point communication system, where n>0, using n reference values of round trip time skews between a respective signalling path and a single reference signalling path of the n+1 signalling paths, and a reference value of a sum of round trip times over all of the n+1 signalling paths as exclusive input values, the respective reference values of round trip times being limited within a predetermined allowed interval for round trip times, and to perform a separate, globally stable, control of data signalling in each single one of the n+1 signalling paths based on the respective reference values of round trip times.

2. The network node of embodiment 1, wherein the network node is a base station.

3. A communication system including a host computer comprising:
processing circuitry configured to provide user data; and
a communication interface configured to forward the user data to a cellular network for transmission to a wireless device,
wherein the cellular network comprises a network node having a radio interface and processing circuitry, the processing circuitry of the network node being configured to determine a respective reference value of round trip time for n+1 signalling paths in the multi-point communication system, where n>0, using n reference values of round trip time skews between a respective signalling path and a single reference signalling path of the n+1 signalling paths, and a reference value of a sum of round trip times over all of the n+1 signalling paths as exclusive input values, the respective reference values of round trip times being limited within a predetermined allowed interval for round trip times, and to perform a separate, globally stable, control of data signalling in each single one of the n+1 signalling paths based on the respective reference values of round trip times.

4. The communication system of embodiment 3, further including the network node.

5. The communication system of embodiment 4, further including the wireless device, wherein the wireless device is configured to communicate with the network node.

6. The communication system of embodiment 5, wherein:
the processing circuitry of the host computer is configured to execute a host application, thereby providing the user data; and
the wireless device comprises processing circuitry configured to execute a client application associated with the host application.

7. The communication system of any of the embodiments 3 to 6, wherein the wireless device is a user equipment.

8. The communication system of any of the embodiments 3 to 7, wherein the network node is a base station.

9. A method implemented in a network node, comprising:
determining of a respective reference value of round trip time for n+1 signalling paths in the multi-point communication system, where n>0, using n reference values of round trip time skews between a respective signalling path and a single reference signalling path of said n+1 signalling paths, and a reference value of a sum of round trip times over all of the n+1 signalling paths as exclusive input values, said respective reference values of round trip times being limited within a predetermined allowed interval for round trip times; and
performing a separate, globally stable, control of data signalling in each single one of the n+1 signalling paths based on the respective reference values of round trip times.

10. A method implemented in a communication system including a host computer, a network node and a wireless device, the method comprising:
at the host computer, providing user data; and
at the host computer, initiating a transmission carrying the user data to the wireless device via a cellular network comprising the network node, wherein the network node determines a respective reference value of round trip time for n+1 signalling paths in the multi-point communication system, where n>0, using n reference values of round trip time skews between a respective signalling path and a single reference signalling path of the n+1 signalling paths, and a reference value of a sum of round trip times over all of the n+1 signalling paths as exclusive input values, the respective reference values of round trip times being limited within a predetermined allowed interval for round trip times;
performing a separate, globally stable, control of data signalling in each single one of the n+1 signalling paths based on the respective reference values of round trip times.

11. The method of embodiment 10, further comprising:
at the network node, transmitting the user data.

12. The method of embodiment 11, wherein the user data is provided at the host computer by executing a host application, the method further comprising:
at the wireless device, executing a client application associated with the host application.

13. The method of any of the embodiments 10 to 12, wherein the wireless device is a user equipment.

14. The method of any of the embodiments 9 to 13, wherein the network node is a base station.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS 3G 3rd Generation
3GPP 3rd Generation Partnership Project
4G 4th Generation
5G 5th Generation
AAS Antenna Array Systems
ASIC Application Specific Integrated Circuits
BTS Base Transceiver Stations
CD Compact Disc
CN Core Network
COTS Common Off-The-Shelf
CPE Customer Premises Equipment
CPU Central Processing Units
DSP Digital Signal Processors DVD Digital Versatile Disc
eNB evolved Node B
FPGA Field Programmable Gate Arrays
gNB New Radio Node B
HDD Hard Disk Drive
HW hardware
IEEE Institute of Electrical and Electronics Engineers
I/O input/output
LEE Laptop Embedded Equipment
LME Laptop Mounted Equipment
LTE Long-Term Evolution
MEM memory units
NB Node B
ND Network Device
NFV Network Function Virtualization
NI Network Interfaces
NIC Network Interface Controller
NR New Radio
OS Operating System
OSS Operations and Support System
PC Personal Computer
PDA Personal Digital Assistant
PLC Programmable Logic Controllers
RAM Random Access Memory
RAN Radio Access Network
RBS Radio Base Stations
REG registers
RNC Radio Network Controller
ROM Read-Only Memory
RRU Remote Radio Units
STA Station
SW software
TCP Transmission Control Protocol
UE User Equipment
URLLC Ultra-Reliable Low Latency Communication
USB Universal Serial Bus
VM Virtual Machine
VMM Virtual Machine Monitor
VNE Virtual Network Element
VR virtual reality
WCDMA Wideband Code Division Multiple Access
WNIC Wireless Network Interface Controller

REFERENCES

R. H. Middleton, T. Wigren, K. Lau and R. Delgado, "Data flow delay equalization for feedback control applications using 5G wireless dual connectivity", Proc. VTC 2017 Spring, Sydney, Australia, Jun. 4-7, 2017

R. A. Delgado, K. Lau, R. H. Middleton and T. Wigren, "Networked delay control for 5G wireless machine type communications using multi-connectivity", to appear in IEEE Trans. Contr. Sys. Tech., 2018.

T. Wigren and R. Karaki, "Globally stable wireless data flow control", IEEE Trans. Contr. Network Systems, vol. 5, no. 1, pp. 469-478, 2018.

The invention claimed is:

1. A method for delay alignment in a multi-point communication system, wherein said method comprising:
   determining a respective reference value of round trip time for n+1 signalling paths in said multi-point communication system, where n>0, using n values of round trip time skews between a respective signalling path and a single reference signalling path of said n+1 signalling paths, and a reference value of a sum of round trip times over all of said n+1 signalling paths as exclusive input values, wherein respective reference values of round trip times being limited within a predetermined allowed interval for round trip times, wherein an acknowledgement or non-acknowledgement signalling associated with signalling in each signalling path is restricted to use a same data path as the signalling; and
   performing a separate control of data signalling in each single one of said n+1 signalling paths based on said respective reference values of round trip times.

2. The method according to claim 1, wherein the performing the separate control of data signalling is performed by separate, globally stable, control of data signalling in each single one of said n+1 signalling paths based on said respective reference values of round trip times.

3. The method according to claim 2, wherein reference values of round trip time for said n+1 signalling paths are calculated as a linear combination of said n values of round trip time skews and said reference value of the sum of round trip times.

4. The method according to claim 3, wherein said reference values of round trip time for said n+1 signalling paths $\check{T}^{res}_{RTT}(t)$ are calculated for time value (t) as:

$$\bar{T}^{ref}_{RTT}(t) = R\bar{T}^{ref}_{RTT,skew}(t),$$

where $$\bar{T}^{ref}_{RTT}(t) = \left(\bar{T}^{ref}_{RTT,1}(t) \ldots \bar{T}^{ref}_{RTT,n}(t)\, \bar{T}^{ref}_{RTT,r}(t)\right)^T,$$

$$\bar{T}^{ref}_{RTT,skew}(t) = \left(\bar{T}^{ref}_{RTT,skew,1}(t) \ldots \bar{T}^{ref}_{RTT,skew,n}(t)\, \bar{T}^{ref}_{RTT,sum,r}(t)\right)^T,$$

$$\text{and } R = \frac{1}{g_0}\frac{1}{n+1}\begin{pmatrix} n & \cdots & -1 & 1 \\ \vdots & \ddots & \vdots & \\ -1 & \cdots & n & 1 \\ -1 & \cdots & -1 & 1 \end{pmatrix},$$

where
$g_0$ is a static gain.

5. The method according to claim 4 further comprising calculating, for each of said n+1 signalling paths, a value of an actual round trip time achieved by said separate, globally stable, control of data signalling.

6. The method according to claim 5 further comprising deriving actual values of round trip time skews between respective signalling paths and said single reference signalling path, as well as an actual value of a sum of round trip times over all of said n+1 signalling paths, by linearly combining said actual values of an actual round trip time.

7. The method according to claim 2 further comprising an acknowledgement signalling associated with said signalling in each single signalling path is performed in an acknowledgement signalling path, being selected according to a predetermined relationship with said each single signalling path.

8. The method according to claim 7, wherein said separate, globally stable, control of data signalling in each single signalling path is performed by using a round trip time reference value $\check{T}^{ref}_{RTT}(t)$ as controller input, which is transformed into a data item in flight reference value $y_{ref}(s)$ by division with a scheduled air interface rate $\check{W}_{air}(t-T_{ul,N})$ into a frequency domain, which data item in flight reference value $y_{ref}(s)$ is compared with measured data item in flight y(s) and being control filtered C(s) into a control signal u(s).

9. The method according to claim 8, wherein said control signal u(s) is saturated to ensure that it is non-negative.

10. The method according to claim 8, wherein said measured data items in flight signal y(s) is based on a data item number v(s) of a last received data item and a latest sent data item number $\bar{v}(s)$.

11. The method according to claim 2, wherein the acknowledgement signalling associated with said signalling in each single signalling path comprises an indication of the respective signalling path of said acknowledgement signalling.

12. The method according to claim 11, wherein said separate, globally stable, control of data signalling in each single signalling path comprises:
collecting round trip time measurements for different combinations of uplink and downlink signalling paths during a time window; and
performing a linear regression based on said collected round trip time measurements, for achieving separate round trip time contributions for all used downlink and uplink signalling paths.

13. The method according to claim 12, wherein said separate, globally stable, control of data signalling in each single signalling path further comprises:
computing a representative round trip time associated with each downlink signalling path in dependence of said contributions of uplink signalling paths used in connection with each separate downlink signalling path; and
using said representative round trip time as feedback in said separate, globally stable, control of data signalling in each single signalling path.

14. The method according to claim 1, wherein reference values of round trip time skews between said respective signalling path and said single reference signalling path, as well as said reference value of said sum of round trip times over all of said n+1 signalling paths are varying with time.

15. A network node to perform globally stable delay alignment in a multi-point communication system, wherein said network node comprising:
a processor; and
a memory comprising instructions which, when executed by the processor, cause the network node to:
determine a respective reference value of round trip time for n+1 signalling paths in said multi-point communication system, where n>0, using n reference values of round trip time skews between a respective signalling path and a single reference signalling path of said n+1 signalling paths, and a reference value of a sum of round trip times over all of said n+1 signalling paths as exclusive input values, wherein respective reference values of round trip times being limited within a predetermined allowed interval for round trip times and wherein an acknowledgement or non-acknowledgement signalling associated with signalling in each signalling path is restricted to use a same data path as the signalling; and
perform a separate control of data signalling in each single one of said n+1 signalling paths based on said respective reference values of round trip times.

16. The network node according to claim 15, wherein the network node is to perform a separate, globally stable, control of data signalling in each single one of said n+1 signalling paths based on said respective reference values of round trip times.

17. A non-transitory computer readable storage medium comprising instructions which, when executed by at least one processor, cause the at least one processor to perform operations for delay alignment in a multi-point communication system comprising:
determining a respective reference value of round trip time for n+1 signalling paths in said multi-point communication system, where n>0, using n reference values of round trip time skews between a respective signalling path and a single reference signalling path of said n+1 signalling paths, and a reference value of a sum of round trip times over all of said n+1 signalling paths as exclusive input values, wherein respective reference values of round trip times being limited within a predetermined allowed interval for round trip times and wherein an acknowledgement or non-acknowledgement signalling associated with signalling in each signalling path is restricted to use a same data path as the signalling; and
performing a separate control of data signalling in each single one of said n+1 signalling paths based on said respective reference values of round trip times.

* * * * *